(12) United States Patent
Davis

(10) Patent No.: US 10,702,773 B2
(45) Date of Patent: Jul. 7, 2020

(54) SYSTEMS AND METHODS FOR PROVIDING AN INTERACTIVE AVATAR

(71) Applicant: Videx, Inc., Corvallis, OR (US)

(72) Inventor: Paul R. Davis, Corvallis, OR (US)

(73) Assignee: Videx, Inc., Corvallis, OR (US)

( * ) Notice: Subject to any disclaimer, the term of this patent is extended or adjusted under 35 U.S.C. 154(b) by 241 days.

(21) Appl. No.: 13/852,062

(22) Filed: Mar. 28, 2013

(65) Prior Publication Data
US 2013/0257876 A1     Oct. 3, 2013

Related U.S. Application Data

(60) Provisional application No. 61/618,593, filed on Mar. 30, 2012.

(51) Int. Cl.
*A63F 13/30*     (2014.01)

(52) U.S. Cl.
CPC ...... *A63F 13/30* (2014.09); *A63F 2300/5553* (2013.01); *A63F 2300/6607* (2013.01); *A63F 2300/69* (2013.01)

(58) Field of Classification Search
CPC .............. A63F 13/30; A63F 2300/5553; A63F 2300/6607; A63F 2300/69; A63F 13/12
USPC .......................................................... 706/12
See application file for complete search history.

(56) References Cited

U.S. PATENT DOCUMENTS

| | | | |
|---|---|---|---|
| 7,094,154 B2 * | 8/2006 | Kellerman et al. | 463/42 |
| 7,356,830 B1 * | 4/2008 | Dimitrova | 725/51 |
| 7,468,729 B1 * | 12/2008 | Levinson | A63F 13/79 |
| | | | 345/473 |
| 7,822,687 B2 * | 10/2010 | Brillon et al. | 705/59 |
| 8,224,652 B2 * | 7/2012 | Wang et al. | 704/275 |
| 8,234,579 B2 * | 7/2012 | Do | A63F 13/60 |
| | | | 705/14.2 |

(Continued)

OTHER PUBLICATIONS

Constructing an Intelligent Behavior Avatar in a Virtual World: A Self-Learning Model based on Reinforcement—2005 Jui-Fa Chen+, Wei-Chuan Lin*, Hua-Sheng Bai+, Chia-Che Yang+, Hsiao-Chuan Chao+.*

(Continued)

*Primary Examiner* — Kakali Chaki
*Assistant Examiner* — Ababacar Seck
(74) *Attorney, Agent, or Firm* — Jones Day

(57) ABSTRACT

Systems and methods are provided for a computer-implemented method of providing an interactive avatar that reacts to a communication from a communicating party. Data from an avatar characteristic table is provided to an avatar action model, where the avatar characteristic table is a data structure stored on a computer-readable medium that includes values for a plurality of avatar personality characteristics. A communication with the avatar is received from the communicating party. A next state for the avatar is determined using the avatar action model, where the avatar action model determines the next state based on the data from the avatar characteristic table, a current state for the avatar, and the communication. The next state for the avatar is implemented, and the avatar characteristic table is updated based on the communication from the communicating party, where a subsequent state for the avatar is determined based on the updated avatar characteristic table.

28 Claims, 16 Drawing Sheets

(56) References Cited

U.S. PATENT DOCUMENTS

| | | | |
|---|---|---|---|
| 8,384,719 B2* | 2/2013 | Reville et al. | 345/473 |
| 8,694,899 B2* | 4/2014 | Goossens | G06Q 10/10 |
| | | | 715/706 |
| 2004/0027352 A1* | 2/2004 | Minakuchi | G06T 13/40 |
| | | | 345/473 |
| 2005/0114142 A1* | 5/2005 | Asukai | A61B 5/16 |
| | | | 704/270 |
| 2007/0168863 A1* | 7/2007 | Blattner | G06F 3/011 |
| | | | 715/706 |
| 2008/0091692 A1* | 4/2008 | Keith | G06F 17/3089 |
| 2008/0124690 A1* | 5/2008 | Redlich | G09B 7/00 |
| | | | 434/236 |
| 2009/0089685 A1* | 4/2009 | Mordecai et al. | 715/757 |
| 2009/0221367 A1* | 9/2009 | Longley | G07F 17/3276 |
| | | | 463/32 |
| 2010/0028846 A1* | 2/2010 | Cohen et al. | 434/323 |
| 2010/0046806 A1* | 2/2010 | Baughman et al. | 382/115 |
| 2010/0205179 A1* | 8/2010 | Carson et al. | 707/740 |
| 2011/0007079 A1* | 1/2011 | Perez | G06F 3/011 |
| | | | 345/473 |
| 2011/0016004 A1* | 1/2011 | Loyall | G10L 13/00 |
| | | | 705/14.72 |
| 2011/0016410 A1* | 1/2011 | Do | A63F 13/60 |
| | | | 715/757 |
| 2011/0296324 A1* | 12/2011 | Goossens | G06Q 10/10 |
| | | | 715/763 |
| 2012/0016926 A1* | 1/2012 | Toga et al. | 709/203 |
| 2013/0258040 A1* | 10/2013 | Kaytaz | H04N 7/157 |
| | | | 348/14.07 |
| 2013/0266925 A1* | 10/2013 | Nunamaker, Jr. | G06N 99/005 |
| | | | 434/362 |
| 2014/0055554 A1* | 2/2014 | Du | H04N 21/4223 |
| | | | 348/14.07 |

OTHER PUBLICATIONS

Constructing an Intelligent Behavior Avatar in a Virtual World: A Self-Learning Model based on Reinforcement—2005 Jui-Fa Chen+, Wei-Chuan Lin*, Hua-Sheng Bai+, Chia-Che Yang+, Hsiao-Chuan Chao+ (Year: 2006).*

Partially Observable Markov Decision Processes for Spoken Dialogue Management Jason D. Williams (Year: 2006).*

* cited by examiner

SYSTEMS AND METHODS FOR PROVIDING AN INTERACTIVE AVATAR

CROSS REFERENCE TO RELATED APPLICATIONS

This application claims priority to U.S. Provisional Patent Application No. 61/618,593, filed Mar. 30, 2012, entitled "Interactive Personality Simulation," the entirety of which is herein incorporated by reference.

BACKGROUND OF THE INVENTION

This disclosure relates generally to animated avatars designed to simulate personality characteristics for entertainment and other applications, and, more particularly, to devices, systems, and methods adapted to capture personality and behavioral profile characteristics of a person and to provide an interactive experience with an animated avatar where the avatar simulates personality and behavioral profile characteristics based on at least a portion of the captured personality and behavioral profile characteristics.

The broad notion of interacting with an artificial intelligence continues to be contemplated and studied. For example, efforts to create virtual agents or automated attendants for commercial use in reception, call center, online presence, and customer service applications have resulted in text-centric (e.g. automated online chat help services) and verbal/voice-centric (e.g. automated call center services) with improved capabilities of accurately receiving and responding to user/customer queries. Service providers of these virtual agents or automated attendants routinely advertise that these kinds of artificial intelligence technologies consistently outperform their human counterparts for the tasks for which they are designed. The effectiveness of these technologies is often measured in terms of the percentage of calls or interactions that result in sales, the accuracy/resolution rate of correctly identifying the query and its corresponding answer, the rate of delivering brand-complementing and legally compliant (i.e. good) answers, the response time between question presented and answer delivered, the number of question-answer pairs, the percentage of calls where the call-query attempt was abandoned, and other similar information delivery-centric metrics.

Virtual agent and automated attendant systems typically do not include flexibility to provide different personality styles, or if they do, such flexibility is limited to pre-selecting personality modes from a discrete range of selectable "personalities" for presentation to the target users. Each different "personality" might have a different tone of voice according to desired gender, speech cadence or rate of word delivery, and other selectable pre-programmed parameters.

Similarly, such agent and attendant systems typically do not have an ability to assimilate new information that modifies future responses. That is, most of these systems do not have capabilities to learn. However, some progress may have been made to incorporate processes whereby the agent or attendant learns by storing queries and information identified as new, then triggers a process by which the new information is selectably (i.e. through human intervention/action) retained and incorporated or discarded.

Further, such agent and attendant systems typically do not involve animated avatars, or if they do, the avatars are animated in very limited ways. Most often the animation is simply to reinforce the presence of an active system that is doing something to address the user's query, or to simply signal that the agent/attendant is in a particular state such as ready or delivering a response or thinking or turned-off/unavailable.

Gaming systems use animated avatars more comprehensively than virtual agent and automated attendant systems. Gaming systems increasingly employ avatars as central aspects of the gaming experience. In fighting-oriented games, for example, the user views the virtual environment through the eyes of an avatar, commonly viewing the user's virtual arms, appendages, weapons, equipment, and so forth. And the user views other users' virtual realizations (or avatars) in the gaming/virtual environment. The gaming industry continues to focus on avatar-centric techniques whereby the avatars, controlled by, and representing, the human users, take on increasingly life-like and realistic behaviors. For example, gaze control, whether user controlled or automated (i.e. sentient gaze), has been recognized as an important aspect of avatar-to-avatar communications, in addition to vocal and other visual queues and communications means.

The avatars used in gaming systems increasingly incorporate more options for the user to customize. Head gear, camouflage, color combinations, weapon systems, names, nicknames, and numerous other individually selectable options allow the user to create a particularly unique avatar or character. In many games, the user is able to modify, improve or upgrade, and add customized features to their in-game character which carryover from each game session to the next game session, thereby allowing the user to continue changing and developing features and characteristics of the user's created character.

The avatars used in virtual world simulation environments, such as Second Life, for example, may be customized into a desired "digital persona" that may or may not resemble the user in real life. Such avatars are typically cartoon-like representations created from a user's selections of various pre-determined or canned selectable options, similar to the gamer's selections of modifications and so forth when changing and adding features to their in-game character.

A more realistic avatar experience has been proposed whereby a typical cartoon-like avatar is animated to mimic (or shadow) the movements and motion of a user whose movements and motions are sensed by a camera/sensor system. The "Avatar Kinect" system may be such a system, as an evolution of Microsoft's Xbox product. The system uses a Kinect camera to animate a typical cartoon-like avatar so as to provide more realistic avatar movements and motion, with software/applications to place the avatar in various environments, situations, and circumstances.

An even more realistic avatar experience has been proposed, in concept, whereby 3D modeling and 2D video might be combined in real time computationally to create a near photo quality, very realistic avatar performance. In concept, such a system might use camera sensors (like Kinect) to capture the movements and motion of a user, then combine the information with a photograph or 2D video of a real person to create an avatar performance. The avatar performance would be very realistic since the appearance of the avatar is synthesized from a photograph or 2D video of the real person, and the avatar's movements and motion is synthesized from movements and motion of the user captured by the camera sensors. In concept, such a system could be used whereby an actor (or user) might read and perform a script which is then synthesized by the system into a corresponding avatar performance, with the avatar appearing as a very realistic/photographically accurate depiction of a different real person that was previously photographed. In such a system, however, particular aspects of the movements and motions of the avatar would theoretically track those of the actor/user/player rather than reflect the particular aspects that may distinguish similar movements and motions of the person previously photographed, unless, of course, the actor/user/player and the person previously photographed were the same person.

Neither advanced avatar systems that provide a very realistic avatar experience, such as providing a photo-realistic avatar having full-body and facial animations, nor artificial intelligence systems for simulating and providing for interaction with such animated avatars have been developed. Moreover, the subcomponent devices, systems, and methods for designing and developing and implementing such systems are not available, or are not available for practical, affordable use, or have limitations that have not yet been overcome or adequately addressed by engineers, inventors, and commercialization efforts. What is needed, therefore, are new and improved devices, systems, and methods directed to the development and implementation of improved animated avatars with improved capabilities and features.

SUMMARY

Systems and methods are provided for a computer-implemented method of providing an interactive avatar that reacts to a communication from a communicating party. Data from an avatar characteristic table is provided to an avatar action model, where the avatar characteristic table is a data structure stored on a computer-readable medium that includes values for a plurality of avatar personality characteristics. A communication with the avatar is received from the communicating party. A next state for the avatar is determined using the avatar action model, where the avatar action model determines the next state based on the data from the avatar characteristic table, a current state for the avatar, and the communication. The next state for the avatar is implemented, and the avatar characteristic table is updated based on the communication from the communicating party, where a subsequent state for the avatar is determined based on the updated avatar characteristic table.

As another example, a system for providing an interactive avatar includes one or more data processors and one or more computer-readable mediums encoded with instructions for commanding the one or more data processors to execute steps. In the steps, data from an avatar characteristic table is provided to an avatar action model, where the avatar characteristic table is a data structure stored on a computer-readable medium that includes values for a plurality of avatar personality characteristics. A communication with the avatar is received from the communicating party. A next state for the avatar is determined using the avatar action model, where the avatar action model determines the next state based on the data from the avatar characteristic table, a current state for the avatar, and the communication. The next state for the avatar is implemented, and the avatar characteristic table is updated based on the communication from the communicating party, where a subsequent state for the avatar is determined based on the updated avatar characteristic table.

As a further example, a computer-readable medium is encoded with instructions for commanding one or more data processors to execute steps of a method for providing an interactive avatar. In the steps, data from an avatar characteristic table is provided to an avatar action model, where the avatar characteristic table is a data structure stored on a computer-readable medium that includes values for a plurality of avatar personality characteristics. A communication with the avatar is received from the communicating party. A next state for the avatar is determined using the avatar action model, where the avatar action model determines the next state based on the data from the avatar characteristic table, a current state for the avatar, and the communication. The next state for the avatar is implemented, and the avatar characteristic table is updated based on the communication from the communicating party, where a subsequent state for the avatar is determined based on the updated avatar characteristic table.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

Figure 15A:
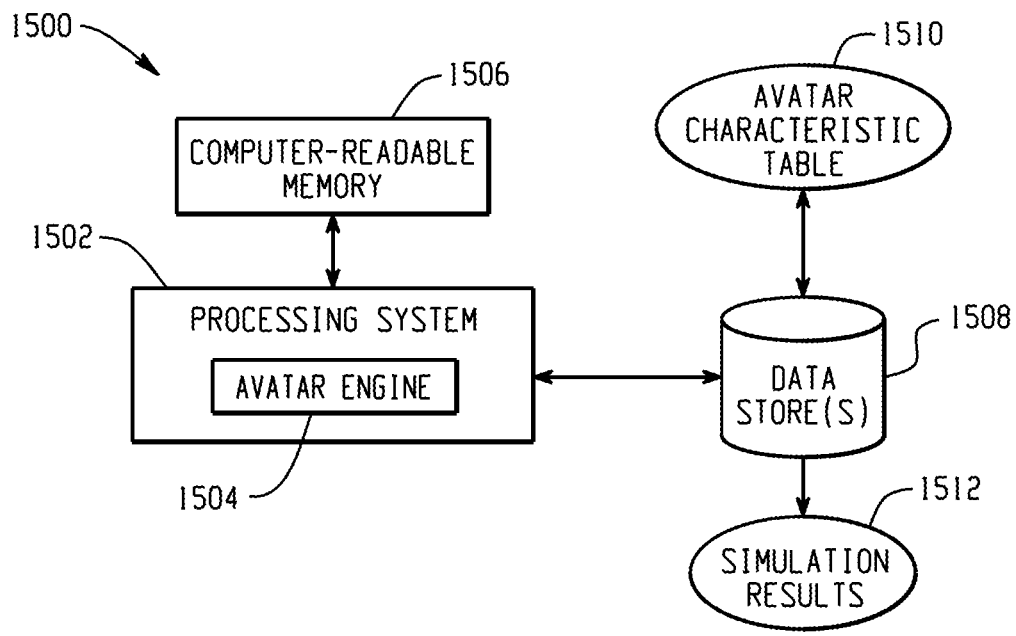
Figure 15B:
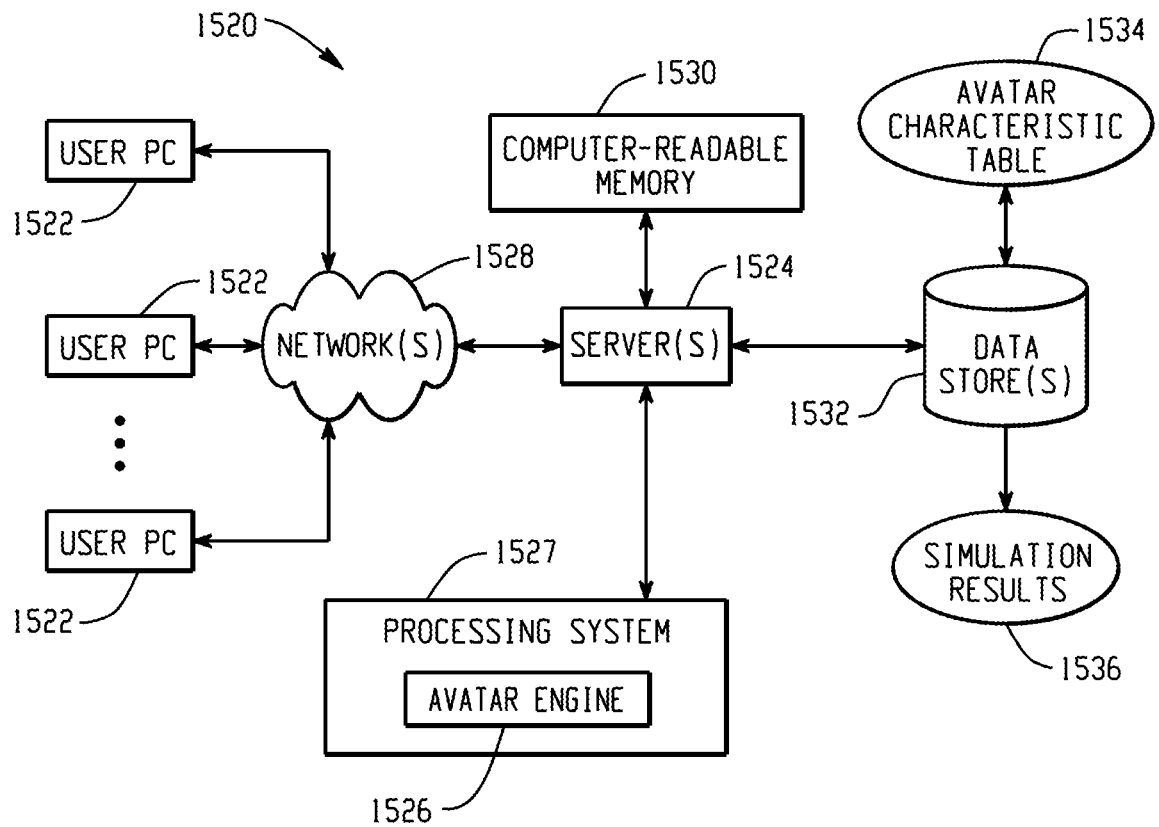
Figure 15C:
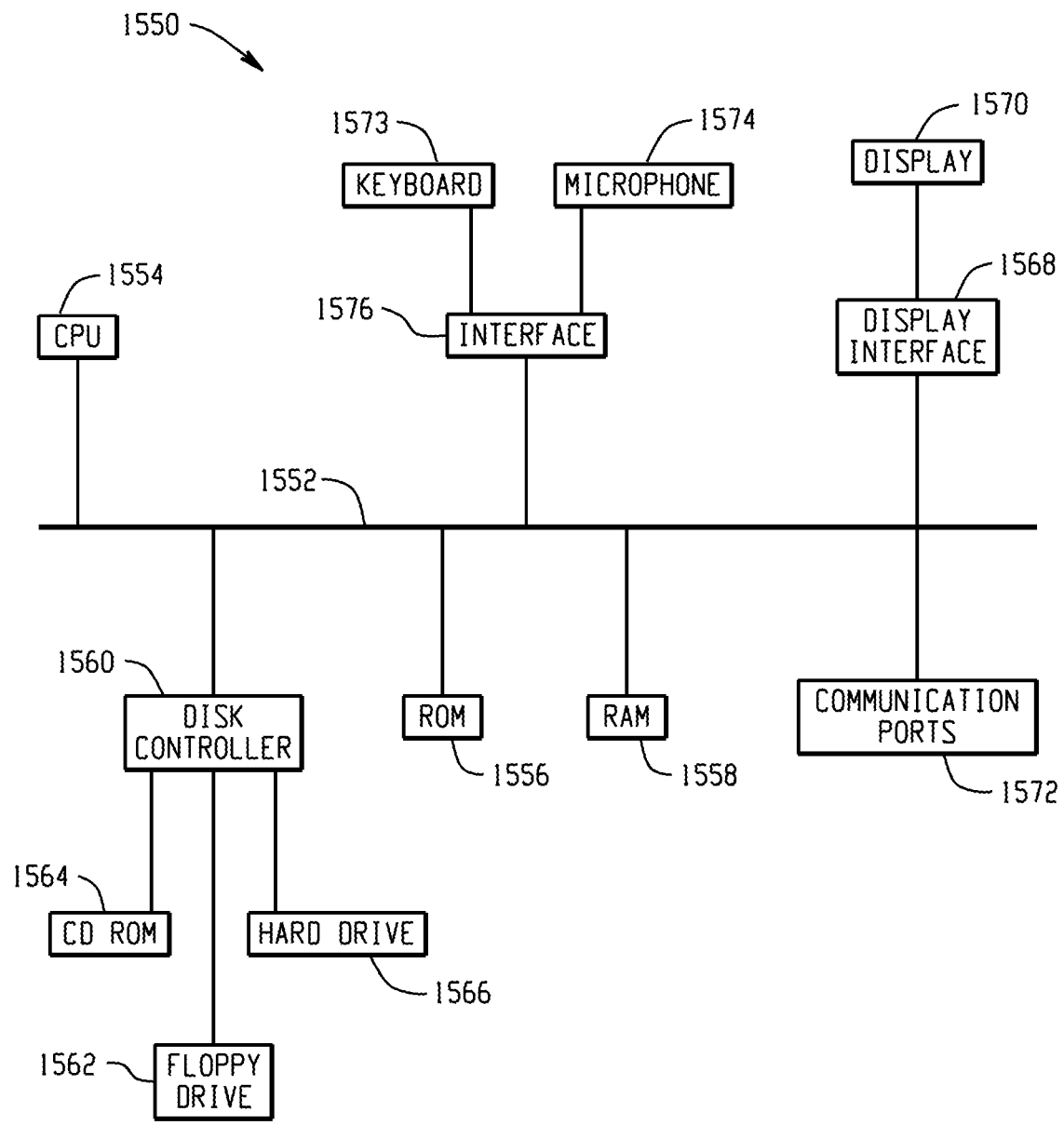

FIGS. 15A, 15B, and 15C depict example systems for use in implementing an avatar engine.

DETAILED DESCRIPTION OF PREFERRED EMBODIMENTS

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Several inventive aspects are described below and in the figures, any one of which the present inventor believes to comprise separable patentable subject matter that is heretofore unavailable with existing technologies, devices, systems, and methods. Further, each of the embodiments described herein may comprise several inventive aspects so as to keep this disclosure reasonably concise. However, the particular combinations of these separable inventive aspects in particular embodiments are not to limit any particular embodiment or limit any particular inventive aspect to a combination with other particular inventive aspects.

Figure 1:
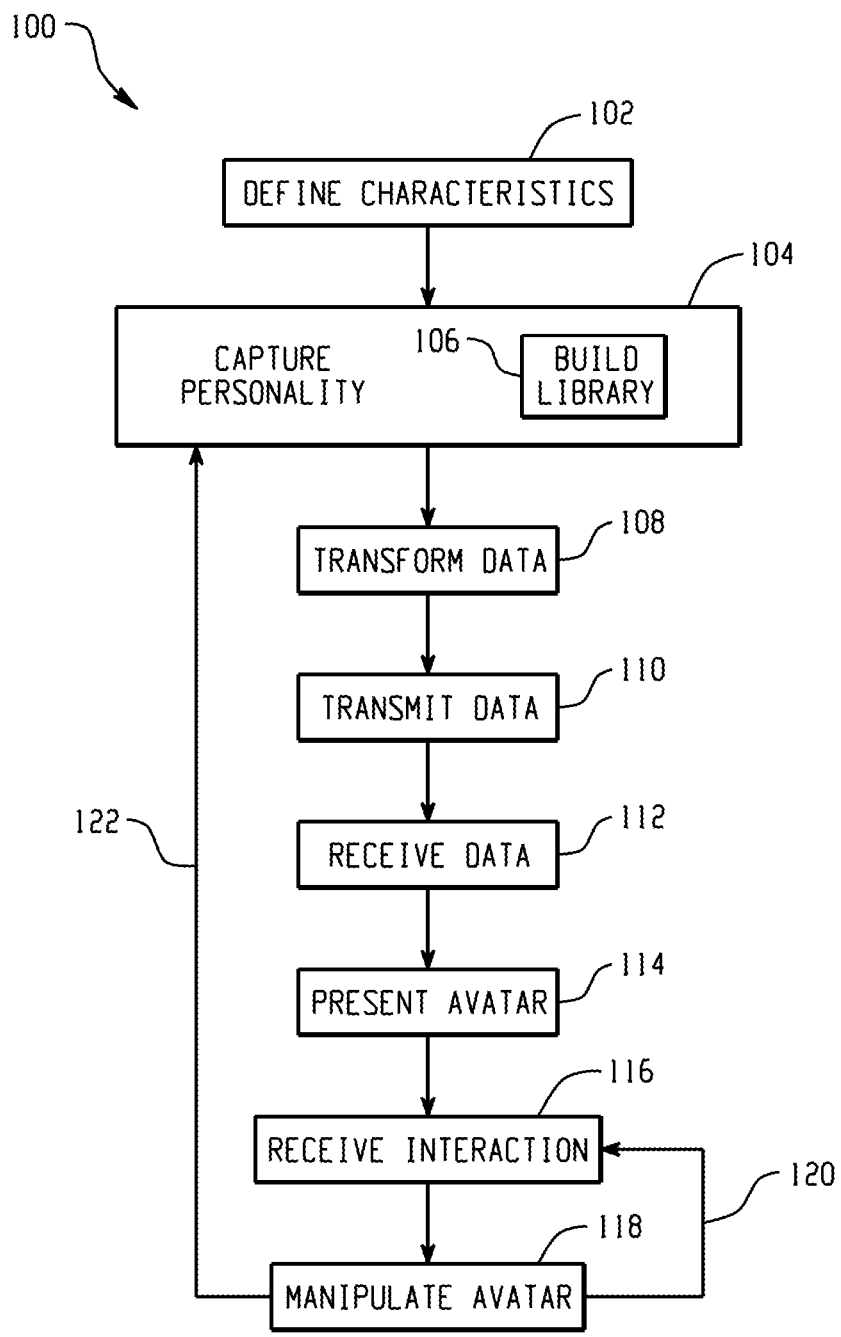
FIG. 1 is an exemplary flow chart that includes personality capture and user interaction with and manipulation of an avatar, according to various embodiments.
Figure 2:
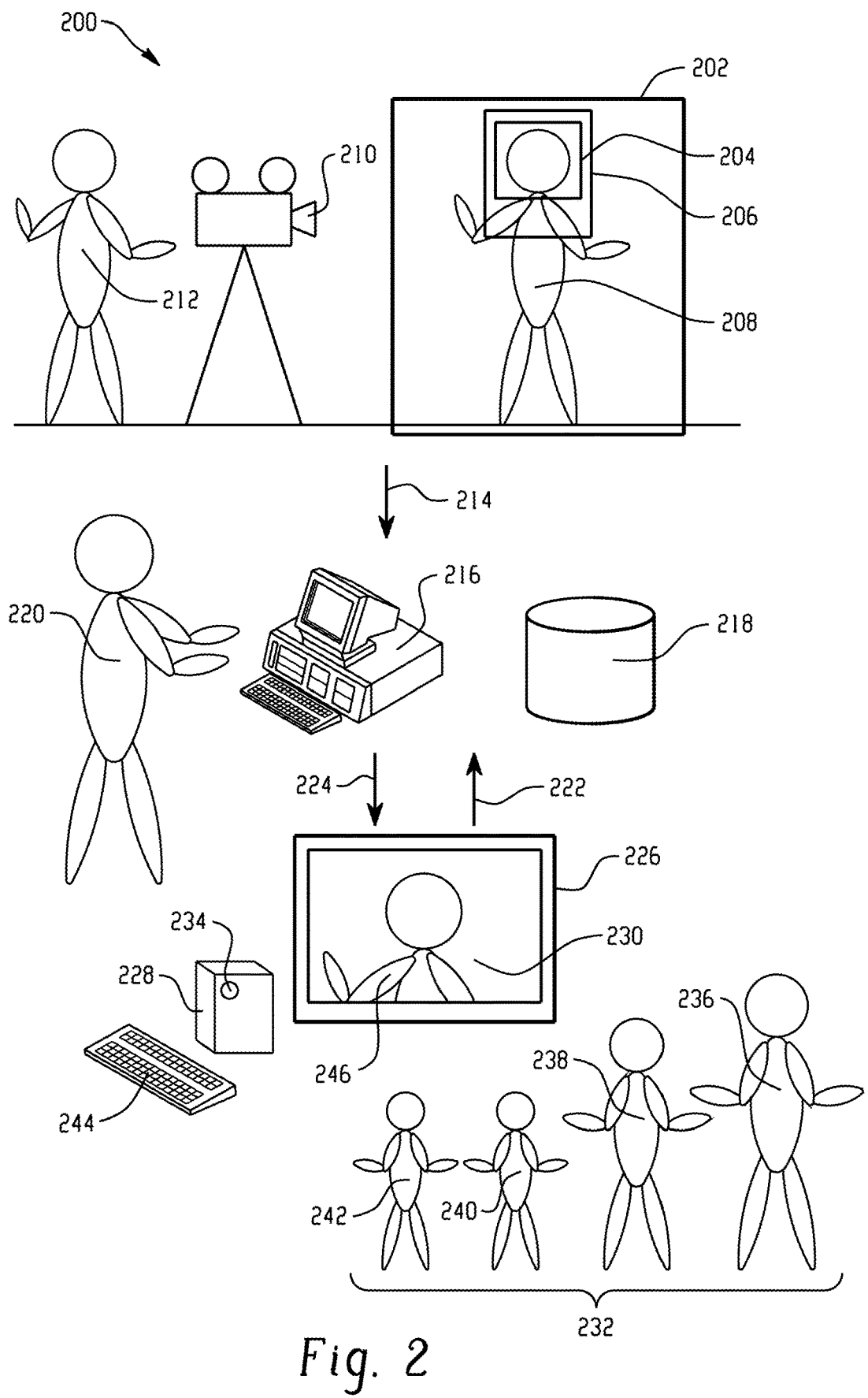
FIG. 2 is an exemplary illustration of interactive personality simulation devices and systems, according to various embodiments.

As a general overview, FIGS. 1 and 2 are provided to illustrate various inventive aspects according to multiple embodiments. The separable inventive aspects are combined in these two figures for ease of description, not to indicate best mode, essential components, or designation of any preferred embodiments.

FIG. 1 is an exemplary flow chart 100 of process steps for an interactive personality simulation system 200 as shown in FIG. 2, according to various embodiments. As an initial concern, the present inventor determined a need to define behavioral and personal characteristics 102 of a target person 208. The characteristics may comprise any of a number of characteristics or qualities that form an individual's (such as person 208) distinctive character, or qualities that make the person interesting (or popular)—which comprises at least one online definition of one's "personality". Meriam-Webster's online definition of personality includes: 1. The complex of characteristics that distinguishes an individual especially in relationships with others; 2. (a) The totality of an individual's behavioral and emotional tendencies; and 2. (b) The organization of the individual's distinguishing character traits, attitudes, or habits. Other definitions abound. The inventor determined that a wide variety of behavioral and personal characteristics, whether several characteristics in combination or a particularly unique characteristic individually, can be used to distinguish a particular person from another. Behavioral characteristics comprise movements (hand, eye, mouth, arm, stance, gait, gaze, etc.), sounds (pitch, tone, rate/cadence, inflection, etc.), phrases, ideas, philosophies, mannerisms, typical verbal responses and language used, and so forth. Personal characteristics comprise physical attributes (height, weight, hair color, skin color, glasses, typical clothing, typical hair style, etc.) that distinguish the person as a unique individual (at a particular point in time, or particular points in time).

To capture the personality characteristics 104 of the target person 208, sound and video recordings may be used when interviewing the target person 208 in order to build a library (or glossary or index) 106 of vocabulary, phrases, likelihoods for various types of responses, sounds, gestures, movements, head and/or body positions, and so forth, which tend to portray the target person's personality. The interrogator 212 may record the target using a video camera 210 to capture photographs, video, and sound (and possibly recordings of other sensory information such as smells and tastes) with different views—head shot 204, head and arms/upper body 206, or full body 202—depending upon the desired corresponding avatar presentation system 226. The interrogator 212 (or script or prompter if an interrogator is not used) preferably presents a variety of questions to the target person 208 in order to solicit a range of different types of responses.

Various personality capture questionnaires may be used. For example, William Sims Bainbridge developed several personality capture modules (software programs) for gathering insights about a particular person. Modules developed or being developed include questions designed to capture a person's predictions and outlook for the future, beliefs (agree-disagree statements), wisdom (agree-disagree statements), emotions (situations that might elicit particular common emotions), experiences a person may have, preferences for foods, judgments of the connections between pairs of words, preferences for various actions, adjectives describing oneself, emotional reactions to events, and others.

Various categories of personality variables may be used. For example, rough categories of personality variables have been suggested by Robert R. McCrae and Paul T. Costa, and include: basic tendencies (genetics, physical characteristics, cognitive capacities, physiological drives, focal vulnerabilities, personal traits); characteristic adaptations (acquired competencies, attitudes/beliefs/goals, learned behaviors, interpersonal adaptations); self-concept (implicit and explicit views of self, self-esteem, identity, life story/personal myth); objective biography (overt behavior, stream of consciousness, life course); and external influences (developmental influences, macroenvironment, microenvironment).

Various methods of developing or characterizing or defining the personality of target person 208 may be used. For example, Crissy Gottberg developed a Character Creation Form to help writers define, describe, and detail personality, including experiences, hopes, joys, passions, and other aspects for development of a character of a novel. The Form is basically a list of questions, some or all of which may be answered for a particular character to be included in the novel. Such a list may be used as part of an interrogator's 212 capture of a target person's 208 personality. Or such a list may be used in a self-answerable questionnaire that the target person 208 completes unassisted by another such as interrogator 212. Or such list may be incorporated into a computer-based utility or application, including possibly an application running on a smartphone or any personal device or client device capable of receiving target person 208 answers and responses.

Gottberg's Character Creation Form includes the following:

Initial Questions—Date this form was created: Full name of character: Reason, meaning or purpose behind the name: Nickname: Reason for nickname: Race: Occupation/class: Social class:

Physical Appearance—Age: How old they appear: Eye Color: Glasses or contacts? Hair color length and style: Weight and height: Type of body (build): Skin tone and type (i.e., harry, slimy, scaly, oily, fair, burns easily): Shape of face: Distinguishing marks (dimples, moles, scars, birthmarks, etc.): Predominant feature: Is s/he healthy? If not, why not? Or why are they healthy? Do they look healthy? Why/why not?

Favorites—Character's favorite color: Least favorite, why? Music? Least favorite music, why? Food: Literature: Expressions: Expletives (curse): Mode of transport: Hobbies: How do they spend a rainy day?

Personality—Are they a daredevil or cautious? Do they act the same alone as when with someone? Habits: Drinks: How much: Greatest Strength: Greatest Weakness: Soft spot: Is their soft spot obvious, why/why not: If not, how do they hide it: Biggest Vulnerability:

Background—Hometown: Type of childhood: First Memory: Most important child hood event that still affects him/her: Why? Education: Religion: Finances:

Family—Mother: Relationship with her: Father: Relationship with him: Siblings, How many, relationship with each: Children of siblings: Other extended family: Close? Why or why not:

Attitude—Most at ease when: Most ill at ease when: Priorities: Philosophies: How they feel about themselves: Past failure they would be embarrassed to admit: Why? If granted one wish what would it be, why?

Traits—Optimist or pessimist? Why? Introvert or extrovert? Why? Drives and motives: Talents: Extremely skilled at: Extremely unskilled at: Good characteristics: Character flaws: Mannerisms: Peculiarities: Biggest regret: Minor regrets: Biggest accomplishment: Minor accomplishments: Darkest secret: Does anyone know? How did they find out:

Self-perception—One word they would use to describe themselves: One paragraph of how they would describe themselves: What do they consider their best physical characteristic and why: The worst one? Why? Are they realistic assessments? If not, why not? How they think others preserve them: What four things would they most like to change about themselves: Why? If they were changed would they be the same person, why/why not: Would changing of number 1 make them happier? Why/why not:

Interaction with Other People—How do they relate to others: How are they perceived by strangers: Friends: Wife/husband/lover: The Hero/Heroin: How do they view the Hero/Heroine: First impression of the char: why? What happens to change this perception: What do people like most about this char: What do they dislike most about them:

Goals—Immediate: Long term: How do they plan to accomplish them: How will others be effected by this:

Problems/Crisis—How do they react in a crisis: How do they face problems: Kind of problems they usually run into: How they react to new problems: How they react to change:

General—Favorite clothing, why: Least favorite, why: Jewelry: Other accessories: Drives: Where do they live: Where do they want to live: Spending habits, why: What do they do too much of, why: Most prized possession, why: People they secretly admire, why: Person they are most influenced by, why: Most important person in their life before story starts, why: How do they spend the week just before the story starts:

In some embodiments, once the target person's 208 personality is captured, the personality data may be received 214 by a computer 216 and database 218 and transformed 108 into compressed data transmittable across a data channel 224 such as a telephone line, broadband cable, wireless channel, etc. The transformed data may be transmitted 110 to an avatar presentation system 226, which receives 112 the transformed data and presents 114 an avatar 246 to one or more users 232 desiring interaction with the avatar 246. The avatar presentation 230 may comprise an animated head and arms/upper body 206, as shown in FIG. 2, or the avatar presentation 230 may comprise an animated full body 202, head shot 204, or other portion of the target person 208. In preferred embodiments, the avatar presentation 230 includes visual animations, audible (i.e. voice) projections, and other presentations (i.e. smells, tastes, vibrations, background depictions of, for example, inertial motion, etc.) hereinafter collectively referred to as "manipulations" of the avatar 246.

As shown in FIG. 2, an operator 220 may be used for receiving 214 the captured personality information, processing/transforming the data 108, and transmitting the data 110 across a data channel 224 for receipt by an avatar display 226. The avatar presentation system 226 is shown principally as a display but preferably comprises a system having means for receiving the transformed data 108, means for presentation of an avatar 246 corresponding to the received data 112, and input means for receiving an interaction 116 with the avatar 246. The presentation means preferably includes means for visual display or image projection of the animated avatar 246 and means for audible/sound projection from the animated avatar 246, as well as means for projecting other types of simulated characteristics associated with avatar 246 (e.g. odor creating/projecting means for simulating smells and odor characteristics, taste creating/projecting means for simulating taste characteristics, etc.).

In some embodiments, processing/transforming the data 108 and transmitting the data 110 across a data channel 224 comprises using an internet browser, an application running on a smartphone or other handheld device, and/or phone line or cellular phone facilities. In some embodiments, receiving data 112 and presenting an avatar 114 comprises a desktop computer or the like, cell phone display, a specific purpose console, image projector, speakers, and/or one or more camera.

In preferred embodiments, one or more users 232 may type a query using a keyboard or other input device 244. The user 232 may also provide interactive inputs via an input sensor 234 that is part of a computing/processing apparatus 228 associated with the avatar system. The input sensor 234 may be a microphone to receive a vocalized query or other audible interaction. The input sensor 234 may be a camera or image sensor for detecting motion inputs from one or more user 232. Or the input sensor 234 may be another type of input receiver—for example, input receiving means such as devices, systems, sensor(s) for smells, tastes, inaudible vibrations, inertial movements of the avatar system, or other inputs intended or received as interactions with the avatar 246.

In preferred embodiments, the avatar presentation system 226 manipulates 118 an avatar 246 whose basic characteristics have been pre-transmitted and received so as to be available along with the personality and behavioral profile characteristics of the interrogated person 208, with the manipulation 118 being responsive to interactions with the avatar 246. The interactions, as previously mentioned, may be simple keyboard inputs, such as for example key strokes on a keyboard, button, mouse, or other input device 244, or the interactions may be other types of inputs. In preferred embodiments the avatar 246 is presented, animated, and manipulated so as to provide an interactive experience for one or more users 232 where the avatar simulates personality and behavioral profile characteristics based on at least a portion of the captured personality and behavioral profile characteristics corresponding to the target person 208.

As shown in FIG. 1, according to preferred embodiments, the step of manipulating 118 the avatar 246 may be followed by receiving further interaction 120 from the one or more users 232, and these steps may be optionally repeated as desired by the one or more users 232. In preferred embodiments, feedback 122 is provided to the process of capturing behavioral and personality characteristics 104 regarding the manipulation 118 of the avatar 246 responsive to a particular interaction 116 (as shown) and/or regarding all or a portion of the particular interaction 116 (not shown) so that successive manipulations may be modified in response to prior interactions. As shown in FIG. 2, feedback 122 information may be transmitted across a data channel 222 from the avatar presentation system 226 to the computer 216 and database 218 for modification of behavioral and personality characteristics associated with interactions between the avatar 246 and the received interactions in general and/or the received interactions from a particular one or more users 232. The avatar presentation system 226 preferably "learns" from the received interactions, thereby providing enhanced simulated responses to future interactions.

For example, the one or more users 232 may comprise a family, such as a father 236, mother 238, son 240, and daughter 242, with the interactive personality simulation system 200 having been designed and populated with behavioral and personality characteristics for interactive photorealistic personality simulation of the kids' deceased grandfather as the target person 208. The kids 240, 242 may interact with the grandfather's avatar 246, asking him questions via keyboard 244 and/or input sensor(s) 234, with the system 200 capable of "remembering" and "learning" from various interactions and providing modified avatar manipulations in response to the prior interactions. For example, the kids 240, 242 may ask their grandfather's avatar about circumstances and events in the past when their parents were their age. The grandfather's avatar preferably responds to the kids' questions by recalling particular information and data previously captured and recorded, and presenting simulated responses based at least in part on the recalled information and data, with the avatar presentation system 226 recording the received interactions. When the kids 240, 242 subsequently return to further interact with their grandfather's avatar 246, again asking about what it was like when their parents were their age, the avatar presentation system 226 manipulates the avatar 246 so as to recognize and recall the particular previous interactions with the kids and simulate future responses appropriately modified in view of those prior interactions (and prior avatar manipulations). That is, in preferred embodiments, the grandfather's avatar 246, in effect, identifies and recognizes the kids, remembers previously interacting with the kids, remembers what they asked last time, remembers the previous avatar manipulations and responses, and uses that information when responding to subsequent interactions with the kids.

The items, devices, and systems shown in FIG. 2 may comprise discrete devices and systems differently aggregated than those shown. For example, the video camera 210 may be included with one or more of the other items shown, such as the computer 216 and database 218. The video camera 210, computer 216, and database 218 may comprise a single system. The database 218 may, of course, be integral to the computer 216. The avatar presentation system 226 may comprise a single unitary appliance that includes the input sensor(s) 234, keyboard/input device 244, and so forth. The avatar presentation system 226 may comprise a unitary appliance that includes the video camera 210, computer 216, database 218, and so forth. In similar fashion, the interrogator 212 and operator 220 may comprise the same person, or the functionality of those items may be incorporated into any one or a combination of other devices. For example, and as previously described, the interrogator 212 may be replaced by an automated system whereby the target person 208 completes the collection and capture of behavior and personality characteristics. Likewise, the operator 220 may comprise the real person 208 or, as for the interrogator 212, may be replaced by an automated system that is integrated into one or the other of, or a combination of, the other devices and systems shown in FIG. 2. It is to be understood that any or all of the above items' functionality may be consolidated into one or more unitary appliances or devices.

In preferred embodiments, the interactive personality simulation system comprises providing animated talking heads with personality simulation for entertainment and personal mementos, in a web browser page. For example, the system may provide an animated talking head such as Max Headroom with Joe Jonas' personality, or with grandpa's personality. The system preferably allows a user to "interact with a personality." For example the system may simulate behavioral profile characteristics so that the talking head/avatar "looks, sounds, and acts like" grandpa, or Janet Jackson, etc. The system preferably includes a capability to map face image capture (of a target real person) to animated wireframe, or capture video "chunks" of behavior during an interview (of the target person). In preferred embodiments, the behavior profile is generated using an intake interview. Also in preferred embodiments, users or owners have a capability to improve the avatar model by adding additional information. For example, "grandpa always did this when he was in that situation."

In various embodiments, the interactive personality simulation system comprises one or more of the following use cases: an iPhone virtual companion, a smartphone avatar, a love token (like Victorian locket), advice from an expert (e.g. Einstein on physics), advice from a celebrity (e.g. Joe Jonas on dating), memento morii (e.g. "Grandpa is gone, but this is what he was like"), "I'm feeling lucky" (interaction with a randomly chosen personality), video phone "custom ringtone" (you see me, but I see an avatar that I bought; or you see an avatar that I bought, and I see you or the avatar that you bought or the avatar I bought for calls to/from you), and an "Avatar 'YouTube plus eBay'" entertainment space.

In various embodiments, the interactive personality simulation system comprises one or more of the following delivery modes. A puppetry mode, whereby a live actor in a call center "performs" the personality. The actor, captured by one or more cameras, directly animates the computer rendered avatar, and the actor speaks audio response(s) live to the user/customer. A server rendered CGI mode, whereby a server renders a personality model generated from interview information. The personality model data is parsed into phonemes, visemes, and behavior cues. The parsed data is fed to a render engine on a server. Video is output to an Ethernet frame grabber. A client rendered video mode, whereby a browser renders a personality model and video capture from interview information. The personality model data and video is parsed into phonemes and video chunks per behavior characteristic. The personality model comprises a Markov decision process (MDP) or partially observable Markov decision process (POMDP) generated from interview information. The output comprises a token stream of phonemes and video "chunks." A video library, phoneme set, and individual Markov chain is loaded at login.

The specification herein uses the term owner to mean the one or more persons or entity who defines the avatar and its behavior model, and/or pays for creation and storage of the avatar; and the term user is used herein to mean the one or more persons who access/interact with the avatar, and/or pay for access to the avatar and its behavior model.

Figure 3:
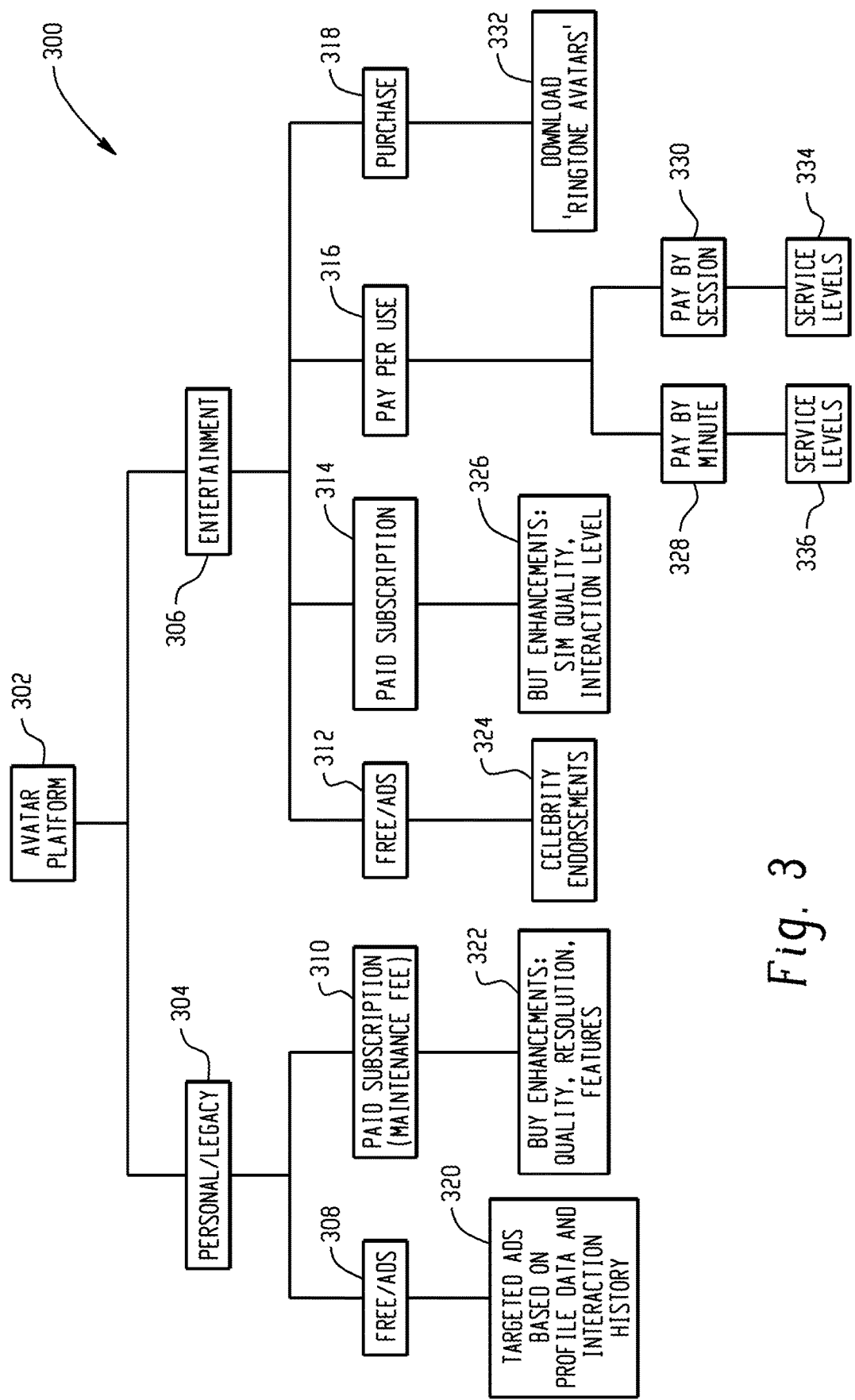
FIG. 3 is a chart showing potential revenue streams, according to various embodiments.

As shown in FIG. 3, the present inventor determined several potential revenue streams 300, according to various embodiments. The revenue streams 300 preferably include revenues from the avatar platform 302 itself. Hierarchically under the avatar platform 302 are revenues in two primary areas, personal/legacy 304 applications (whereby the avatar platform is primarily directed to memorializing a particular person) and entertainment 306 applications (whereby the avatar platform is primarily directed to entertainment use, likely involving capturing personality characteristics for the user or a celebrity personality). The personal/legacy 304 applications preferably include revenues from advertisements 308 when use of the avatar platform 302 is provided free of charge to the user, with targeted ads 320 preferably based on user profile data and user interaction history data. For example, advertisements may be provided before, during, after, or interrupting an avatar interaction session. The advertisements may be targeted based on data associated with the human subject represented by the avatar or based on data associated with the party interacting with the avatar. Advertisements may take a variety of forms. For example, an advertisement may be displayed as a product placement in an avatar display (e.g., grandpa drinking a Coke, a Verizon billboard being shown in the background behind an avatar). The personal/legacy 304 applications may be provided on a paid subscription 310 whereby the user pays a periodic "maintenance fee" for use of the avatar platform 302 and for maintaining, for example, online/cloud data storage and availability for accessing the avatar platform 302. Also under a paid subscription 310 plan, users may be offered opportunities to purchase enhancements 322 such as quality or resolution improvements, or added features/functionality. For example, a base model avatar may only accept text input communication. Upgraded versions of the avatar may include automatic speech recognition capabilities, where an avatar interacts with spoken data input from an avatar user. Additionally, paid upgrades may improve resolution of a depicted avatar. A base model avatar may be cartoonish in character, while upgraded versions become more photorealistic and include more detailed modeling of facial characteristics.

The entertainment 306 applications preferably include revenue streams from advertisements 312 when use is provided free of charge to the user, potentially with targeted ads (not shown). Celebrity endorsements 324 may be provided so as to increase user interest. Paid subscription 314 service may be provided, with offers to buy enhancements 326 such as improved simulation quality, interaction level, and the like. Also under the entertainment 306 applications, a pay-per-use 316 option is preferably offered whereby a user is provided options to pay by-the-minute 328 or pay by-the-session 330, with varying service levels 336, 334 for each, respectively. The services levels 336, 334 may comprise, for example, availability during certain hours and/or days of the week, options for parental control, options for securing and limiting access to preselected authorized users, options regarding a range of selectable avatars 246, degrees of interactivity (e.g. interaction via text inputs only, via voice and text, via audio and visual inputs, etc.), or other options in the level of service provided to the one or more users 232. Various service levels may, of course, be provided for other revenue streams that may be associated with the avatar platform 302. Preferably, the entertainment 306 applications include a purchase 318 option, whereby a user may, for example, download "Ringtone Avatars" 332.

In some embodiments, the interactive personality simulation system may comprise a "call center" using live actors to impersonate celebrities/legends. The live actor provides the "personality" characteristics in place of target person 208, and a camera 210 may capture the actor's performance. In one embodiment, the live actor, whose avatar 246 is presented to one or more users 232, receives interactive data (such as text input, live voice, live video, and/or other information) and responds thereto. Such a system may be as represented and described in FIG. 2. The system may comprise live motion capture ("mocap") broadcast to one or more users 232, or optionally one or more users 232 using one or more avatar presentation systems 226. In one embodiment the live mocap may be broadcast via VGA/DVI (Video Graphics Array/Digital Visual Interface) signal processing products and frame grabbers such as those provided by Canadian company Epiphan Systems, Inc. In some embodiments, voice changers may be used by the one or more users 232, as desired or needed, to alter the voice interaction information transmitted back to the actor/performer. Voice changers may also be used to alter the voice performance information transmitted from the actor/performer.

Such a "call center" system is preferably simple/easy to set up so as to allow generation of revenues quickly. For example, a standard 800 number may be used with commercial off-the-shelf (COTS) call center systems. Using a local actor talent pool may be preferred to provide good quality personality simulation without computer time, to control or minimize system and/or call center operation costs, and/or to simplify possible personality licensing issues/costs.

Figure 4:
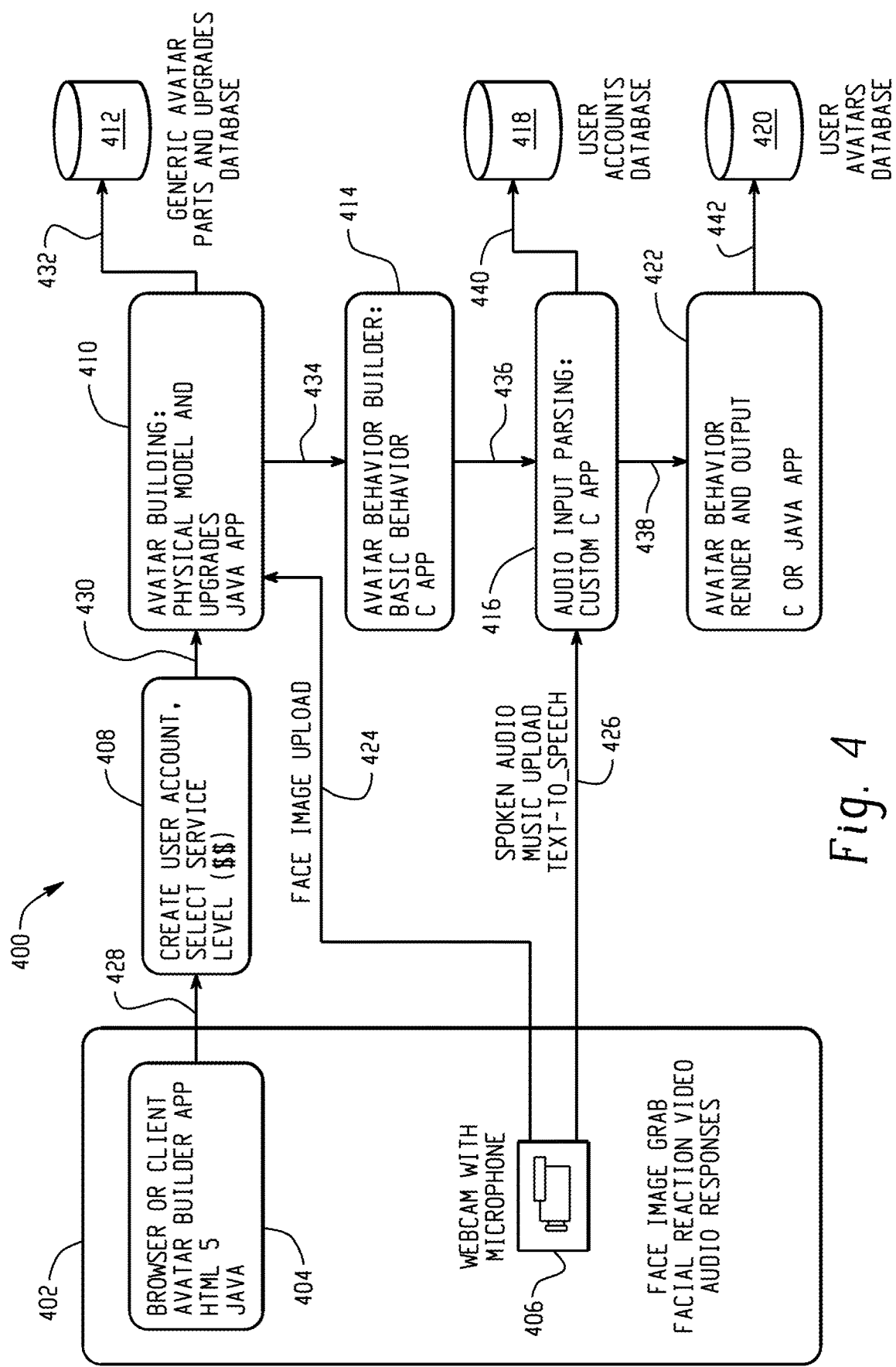
FIG. 4 is an exemplary website architecture for an avatar builder website, according to various embodiments.

An exemplary website architecture 400 for an avatar builder website is shown in FIG. 4, according to various embodiments. As shown, the avatar builder website architecture 400 includes, generally, one or more input devices 402, which may include a browser or client avatar builder application 404 (using HTML 5, Java, and/or similar means) running, for example, on a laptop or PC, for building one or more avatars. The input device 402 may include an integral or standalone audio-visual input means 406 such as a webcam with associated microphone, for face image grab, facial reaction video, and/or audio responses. In a preferred embodiment, a browser or client application 404 is used to access 428 website resources 408 for creating a user account, logging in to website resources, selecting service levels, and/or handling account administration. Once logged in, the user may click or move or otherwise transition 430 to utilities and resources of an 'Avatar Builder' to create one or more personalized avatar. In some embodiments, the user starts with avatar building 410 to develop and/or choose a physical model and upgrades (using Java applications), preferably accessing 432 a generic (stock) avatar parts and upgrades database 412 and importing/uploading 424 the user's own face or other video/images from webcam 406. Upgrades may be any of a wide variety of attributes, some of which may comprise purchasable "bling" upgrades for enhancing the avatar being constructed.

Although transitions 430, 434, 436, 438 are shown for moving from one avatar constructing utility to another, in a sequence thought to be most logical and expedient, the particular order and arrangement of such website may be different and allow for transitions from any particular construction/builder website resource to another. For example, the user may transition from selection of physical model and upgrades to an avatar behavior builder 414 and then go back to change selections of upgrades, etc. in the prior avatar physical model and upgrades resource 410 or jump to audio input parsing 416 or another avatar builder resource.

As shown in FIG. 4, from a physical model and upgrades selection resource 410, the user may transition to the avatar behavior builder 414 for establishing basic behaviors of the avatar (the website resource preferably using an application written in C or a similar programming language). An audio input parsing resource 416 (preferably using a custom C application) is shown receiving 426 spoken audio, music uploads, and/or text-to-speech from (a microphone of the) audio-visual input device 406 and storing 440 information about the particular user's avatar(s) in a user accounts database 418. Also shown is a web resource for avatar behavior render and output 422 with access 442 to an associated user avatars database 420.

The architecture illustrated in FIG. 4 preferably provides a browser or client based user experience whereby an avatar lip-syncs to text or an audio stream. Preferably, the user may accomplish one or more of the following: record and choreograph performances, upload music, live sync to phone/video/text messages, and send email to friends and family with download link. Preferably the avatar shows an incoming caller ID and animates and lip-syncs phone or video or text message. In some embodiments, the avatar builder website architecture 400 provides a foundation for an 'Avatar YouTube', 'Ringtone Avatars', and 'Video Avatars', as described below.

An "Avatar 'YouTube'" may comprise an avatar performance showcase where users may create avatars and avatar performances. In one embodiment, an 'Avatar Builder Website' as in FIG. 4 may be used to create an avatar. Preferably the "Avatar 'YouTube'" allows for people to 'like' and/or 'follow' avatars, as they might use other type of social media. Preferably, people can buy and customize avatars. Avatar creators and/or avatar performance creators may obtain compensation (i.e. money, points, credits, etc.) for popular avatars and/or avatar performances. An eBay auction model may be used for distributing avatars. In some embodiments, the output is video (perhaps Flash) in a small window on a browser. In one embodiment, the output could be an actual YouTube Channel.

According to various embodiments, smartphone ringtone avatars may be provided. In one embodiment, the user may log onto a website to, for example, access an 'Avatar Builder' or similar website as in FIG. 4. As previously described, the user may be provided options for building, customizing, and/or accessorizing one or more avatars. In preferred embodiments, a basic avatar may be provided to the user free from further charges and payments. Additional features, customizations, etc. may be provided for extra charges and payments. The avatars may be stored locally on site, and/or the avatars may be stored remotely (i.e. "in the cloud"). The user is preferably provided a capability of sending a link so that friends/family can download the user's avatar and associate it with the user's cell number. Those who downloaded the avatar and association would see the user's avatar when the user calls, with the user's avatar animating the words spoken by the user during the phone call. The avatar may take the form of a presented talking head or, perhaps for additional fees or charges, full body animation. When a call comes in, the avatar appears on the screen. When the call is answered, the avatar moves and (apparently) 'speaks' the words spoken. The speaker's avatar never has a bad hair day, and upgrades to the speaker's avatar (i.e. to add "bling") may be purchased.

In similar fashion, video ringtones may be used. A caller may use avatars for video calls (e.g. Facetime, Skype). Video ringtones may be similar to custom ringtones for audio calls. The video ringtone is preferably unique for each person. In one embodiment, the receiving person sees the physical video/picture of the video ringtone user, and the video ringtone user sees an avatar set up for the particular received person. For example, you see me, I see an avatar; my boyfriend sees me, I see Tom Cruise (i.e. the avatar I have associated with the calling party); my mother-in-law sees me, I see Medusa. In some embodiments, the user downloads an animation model; then speech-driven animation; real-time lip-sync to audio, with gesture model. Applications may include smartphones, tablets, PC/Mac (desktop) computers, other types of handheld devices, display phones, etc.

Avatars may be stored and implemented using a variety of different protocols. In one example, an avatar is implemented using computer-generated imagery (CGI). In the example CGI implementation, a human subject on whom the avatar is based is observed interacting with another person or an avatar or a device or object, such as in the form of an interview. Multiple observations (interviews) may be conducted to add additional depth to the model of the human subject, stored in data structures, such as one or more avatar characteristic tables stored on a computer-readable medium that include values for a plurality of avatar personality characteristics. Behaviors are captured from the observation of the interactions, such as in the form of video and phonemes. The video may be analyzed to create a behavior model as a Markov probability chain. The video may be further processed to extract phonemes, visemes, and other data that can be integrated into a partially observable Markov decision process model (POMDP). The extracted phonemes, visemes, and POMDP model are stored for the human subject, such as in avatar characteristic tables, and are made accessible for subsequent access in implementing an avatar based on the human subject.

In one example, a CGI avatar is accessed based upon a request by an avatar user who has logged into an avatar providing website. A server associated with the website transmits phonemes and the POMDP model (e.g., a Markov model) to the browser. Avatar user input is received at the browser (e.g., text, voice), such as a communication from the avatar user to a displayed implementation of an avatar. The avatar user input is parsed for triggers that enter and/or drive the probabilities in the POMD chain. Based on analysis by the POMDP model, Markov tokens are output to the browser. A server-side application traverses the Markov chain, selects a video and audio response, then outputs visemes and phonemes to a rendering engine. The visual representation of the avatar is based on a base model and the viseme and phoneme stream provided. A video output is captured, such as by an Ethernet frame grabber, and is outputted to a video frame in the browser.

Another example avatar is implemented using a series of video clips, such as short video clips captured during observations of the human subject. For example, the human subject participates in one or more interviews or other observed discussions. Video and phonemes are captured during the observations. The video is analyzed to create a behavior model, such as a Markov probability chain or a Bayesian network. The video is compressed, and the phonemes are stored.

An avatar user logs into a website and requests interaction with the avatar. A collection of captured video segments (e.g., a video brick), phonemes, and the Markov model are loaded onto a browser of the avatar user. In one example, such a video brick is captured during observations of a human subject, such as observations of an initial interview. Video is captured as a video blob, which is segmented, indexed, and stored in a database. During interaction, avatar user input is parsed, and behavior output is derived from a Markov chain. Portions of the video blob are accessed and output along with synthesized speech, where the outputted video and audio may undergo crossfade and tweening operations to smooth transitions between segments. In one example, Markov tokens are output to the browser. A browser-side application traverses the Markov chain, selects an audio and video response to the input received from the avatar user, and outputs associated captured video clips to the browser for display. A smoothing operation, such as a tweening operation, may be performed to smooth transitions from one video segment to another. For example, an avatar action model may select a series of video segments as a response to a received communication from the communicating party. The selected video segments are accessed and appended to one another to form a stream of video that forms the basis of the response. The stream of video clips, which can include simulated speech, gesturing, cadence, and facial movements that mimic those of the human subject, captured during observation of the human subject, may undergo processing, such as transition smoothing operations, to provide a more natural transition from one video segment to the next in the stream. Audio processing may utilize phoneme speech synthesis to generate audio for a response, where a selected avatar response is modified based on phonemes captured from observations of the human subject so that the outputted audio sounds like the human subject.

A further implementation displays an avatar as an animated talking head. A human subject is observed during one or more interactions, where photos of the human subject (e.g., the subject's face) are captured as well as an audio response stream. For example, the human subject may be observed during one or more video chat conversation, such as via Skype, using a computer webcam and microphone. The captured image is mapped to an articulated wireframe. Nodes and control points can be scaled as necessary. The wireframe is customized based on the photo input and stored in a database, such as in a record associated with an account. Upon request by an avatar user, the customized wireframe is loaded.

The wireframe avatar may be depicted according to live action motion capture of a live actor, with whom the avatar user is interacting. For example, the wireframe avatar may speak words spoken by the live actor, whose voice is modified to sound like the human subject based on voice characteristics captured during avatar model building. The wireframe avatar may move in accordance with movements of the live actor, such as those captured by a motion sensing device, such as an Xbox Kinect. The wireframe avatar may further be augmented based on gestures and gesture timing (e.g., a facial tic) captured during observation of the human subject. In an alternate embodiment, the wireframe avatar may be implemented in an animated fashion, without motion capture of a live actor. Gesture timing, speaking cadence, and other characteristics of the human subject observed during intake are applied to the customized wireframe, which is manipulated based on actions and phonemes selected by an avatar action model for outputting. In one implementation, a generic wireframe model is preloaded at a browser as part of user interface code. Facial geometry and behavior mechanics of the human subject are loaded at initialization time. Facial geometry may be driven by a token stream parsed at the browser. For example, when an avatar action model provides a "38H" command, the wireframe model smiles, as directed by preloaded mechanics of the smiling gesture.

Figure 5:
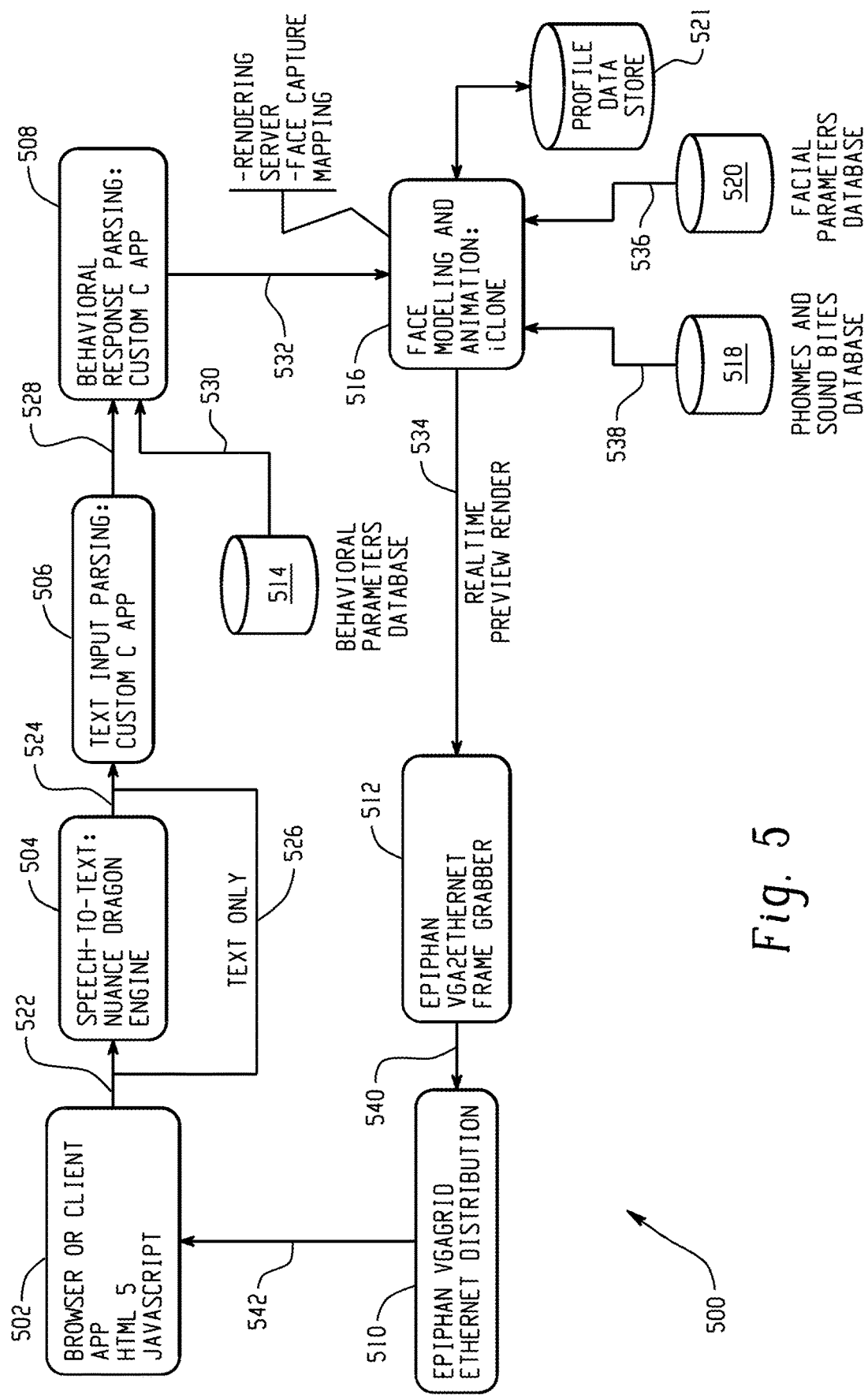
FIG. 5 is an exemplary output architecture for interactive personality simulation, according to multiple embodiments.

FIG. 5 is an exemplary output architecture 500 for interactive personality simulation, according to multiple embodiments. A communicating party, such as an avatar user, accesses an avatar engine through a web browser or other client application 502, such as an application implemented using HTML 5 or JavaScript. The communicating party provides a communication to a depicted avatar via communication channel 522. When the interaction is audio in nature, the interaction is provided to an automatic speech recognition engine 504, such as a Dragon speech recognition engine. The output of the speech recognition engine 504 or text only input 526 from the client application 502 is provided via channel 524 to a text input parsing application 506, such as an application implemented via a custom C app. The parsed text input is transmitted via channel 528 to an avatar action model 508, which is configured to select the next state of the avatar that is to be displayed. For example, the avatar action model may determine the next state of the avatar based on behavioral data from one or more avatar characteristic tables stored in a behavioral parameters database 514. Those avatar characteristic tables may be populated based on one or more observations of a human subject, where the data stored within the avatar characteristic tables represents captured characteristics of the human subject, such as vocabulary, visual characteristics, and behavioral tendencies (e.g., likelihood to get aggravated based on a given type of stimulus). The avatar action model may take a variety of forms such as a Markov model or a Bayesian network. In one example, the avatar action model generates a probability table based on data from the avatar characteristic table 514, the current state of the avatar, and the communication from the avatar user. The probability table identifies the probability that the human subject would exhibit a particular type of response based on the known characteristics of the human subject stored in the avatar characteristic table and the current context of the avatar user interaction. A random number is then selected, and one of the responses is selected from the probability table based on the random number (e.g., when the probability table identifies a 5% probability of the human subject exhibiting an "annoyed" response, random numbers 1-5 when selected from a range of 1-100 will command an "annoyed" response to be outputted by the avatar). In such an implementation, the same inputs to the avatar action model 508 (e.g., the same avatar characteristic data 514, the same avatar user communication, and the same avatar current state) could result in differing behavior being exhibited by the avatar (i.e., similar to humans, the avatar could exhibit different responses when asked the same question in the same context). The avatar action model 508 may be implemented using a variety of technologies, such as a custom C application.

Upon selection of the next state of the avatar (e.g., selection of a series of phonemes and visemes to be outputted), an avatar modeling and animation engine 516 is engaged to implement the next state. The avatar modeling and animation engine 516 may access a phoneme and sound bite database 518 and a facial parameters database 520 to access characteristics of the human subject that are to be incorporated into the depiction of the next state of the avatar. Other avatar characteristic data from a profile data store 521 may be accessed to further customize the next state implementation of the avatar (e.g., details of a shirt that the human subject wore, "bling" upgrades to the avatar such as paid jewelry upgrades). The avatar modeling and animation engine 516 uses the avatar next state from the avatar action model 508 as well as the database 518, 520, 521 data to generate the implementation of the next state of the avatar. The avatar modeling and animation engine 516 may take a variety of forms. In one example, the engine 516 is a face modeling and animation engine that utilizes software such as iClone. In another example, the engine 516 is realized using a rendering server, face capture mapping, or other technology.

The avatar's next state generated by the avatar modeling and animation engine 516 (e.g., a real-time preview render)

is outputted for further processing, such as frame grabber processing 512 or VGAGrid distribution 510 in preparation for display at the client application 502. The output of the avatar modeling and animation engine 516, following any post processing, is provided to the client application 502 so that the next state is made discernible to the communicating party (e.g., the avatar moves, speaks, emits a smell, or otherwise changes). The communicating party may then provide further communication to the avatar, which is further processed to determine the next state of the avatar, where such processing continues in a cyclical fashion.

Figure 6:
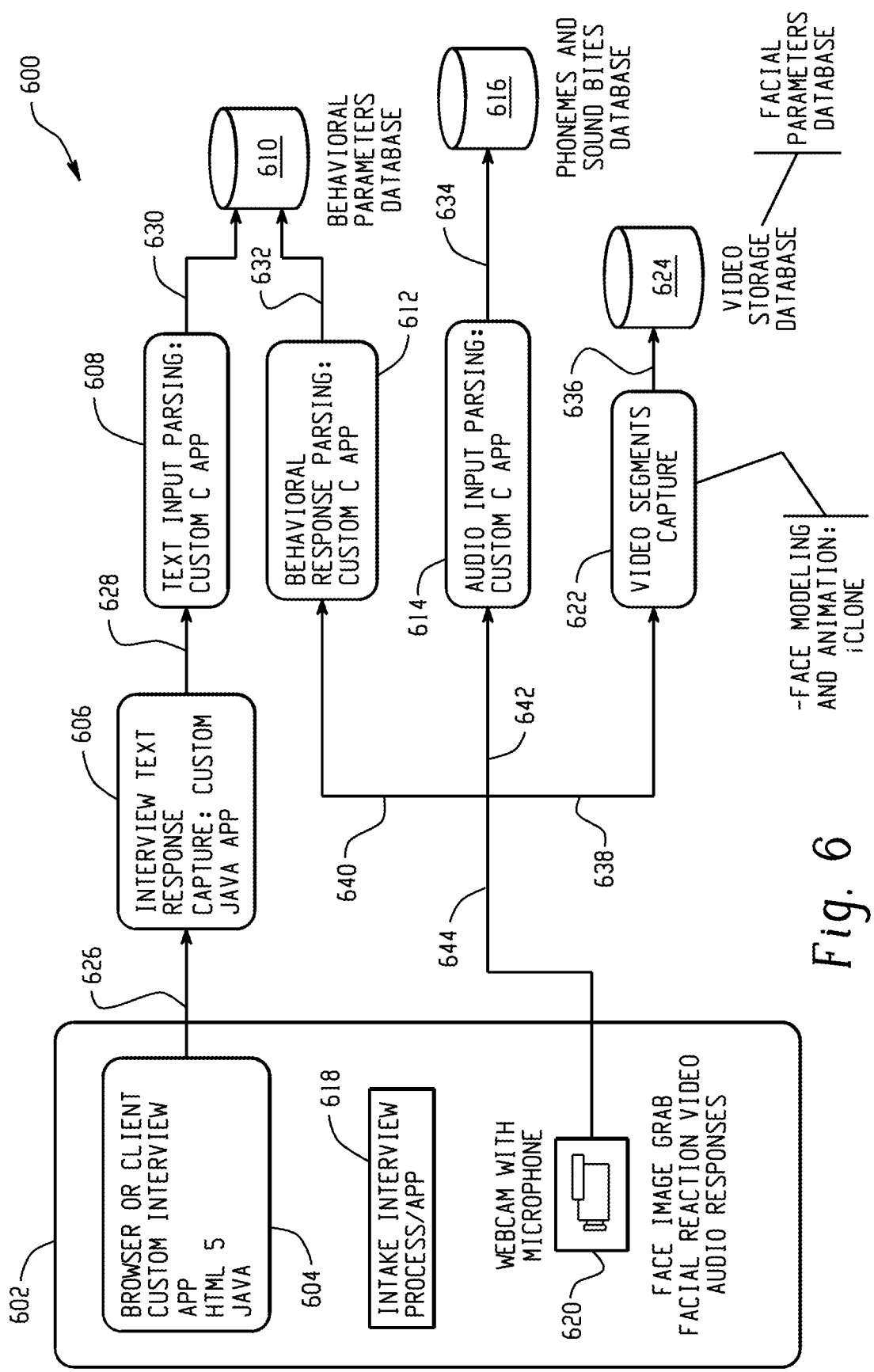
FIG. 6 is an exemplary intake architecture for personality capture, according to multiple embodiments.

FIG. 6 is an exemplary intake architecture for personality capture, according to multiple embodiments. As shown, the avatar builder intake architecture 600 includes, generally, one or more input devices 602, which may include a browser or client avatar builder application 604 (using HTML 5, Java, and/or similar means) running, for example, on a laptop or PC, for building one or more avatars. The input device 602 may include an integral or standalone audio-visual input means 620 such as a webcam with associated microphone, for face image grabs, facial reaction video capture, and/or audio response capture. An intake interview process or application 618 may be provided to guide a human subject through an interview process, where the human subject's behavior during the interview is observed, and characteristics of the human subject are extracted to develop a model of the human subject that can be used to implement an avatar. An interview could be conducted automatically, where stimuli are provided by the application 618, or the interview application 618 could facilitate remote administration of an interview with a live interviewer, such as via a video web chat. An interview process 618 may include a number of stimuli. For example, an interview may include a text answer portion, where demographical, biographical, and other more personal questions may be asked of a human subject, where answers are entered in text form, such as via a web browser 604. At 606, the text responses to interview questions are captured, such as via a Java app, and at 608, the text answers are parsed for integration into one or more avatar characteristic tables stored in a behavioral parameters database 610. For example, in an interview where a human subject is asked about his favorite time of day, and the human subject answers morning, certain values for personality characteristics in the avatar characteristic tables related to the human subject's disposition may be adjusted to represent a pleasant personality.

Certain interview questions may also utilize video and audio capture of the human subject's responses. The webcam and microphone 620 may perform facial image grabs, capture facial reaction video, and collect and store audio responses, which are transmitted to appropriate modules for storage in avatar characteristic tables as part of the avatar model building process. Certain data captured by the webcam and microphone 620 may be forwarded to a behavioral response parsing application 612. Such an application analyzes the collected data to make judgments on the behavior of the human subject based on observations of the interview. For example, when the human subject becomes agitated when asked certain questions, values for certain avatar personality characteristics may be appropriately adjusted to denote the sensitivity of those topics to the human subject as well as the tendency of the human subject to become agitated at times.

The captured video and audio may also be parsed to collect physical characteristics of the human subject for use in generating a more accurate depiction of the human subject in an implemented avatar. Audio captured from the interview may be parsed at 614 to capture examples of different phoneme pronunciations by the human subjects. By capturing accurate phoneme samples, an implemented avatar can provide synthesized speech of the human subject and even create speech that sounds like the human subject saying words that may never have been said by the human subject during an observed interaction. Samples of different phonemes can be stored in a repository 616 for use in implementing the avatar. Similarly video segments can be captured and indexed at 622 and stored in a repository 624 for use in implementing an avatar. Like the phonemes described above, visemes (e.g., small segments of stored video) of the human subject can be pieced together to generate the appearance of a lifelike avatar, even an avatar performing a sequence of gestures that was never exactly observed. Using behavioral tendencies stored in avatar characteristic tables, a series of movements typical of the human subject can be synthesized by piecing together visemes, where smoothing operations can soften transitions between stored video segments.

In another example that utilizes CGI avatars instead of viseme type avatars, the captured video can be used to identify and index certain facial features exhibited by a human subject during observed interactions. Facial modeling and animation software, such as iClone or Xbox Kinect, can be used to capture parameters of different expressions and gestures performed by the human subject (e.g., scowl, smile, chuckle, laugh). Such parameters can be stored in a facial/gesture parameters database. When an avatar model, such as an avatar action model, determines that a next state of the avatar includes one of such expressions, the parameters of the human subject performing that expression can be recalled from the facial parameters database and used to generate a CGI implementation of that next avatar state for interaction with a communicating party. For example, the avatar action model may pass a chuckle token to an iClone facial animation module, which renders an avatar performing a chuckle expression according to the facial parameters database values associated with the human subject for display at a web browser, such as by applying those expression and gesture parameters to a displayed wireframe model.

Figure 7:
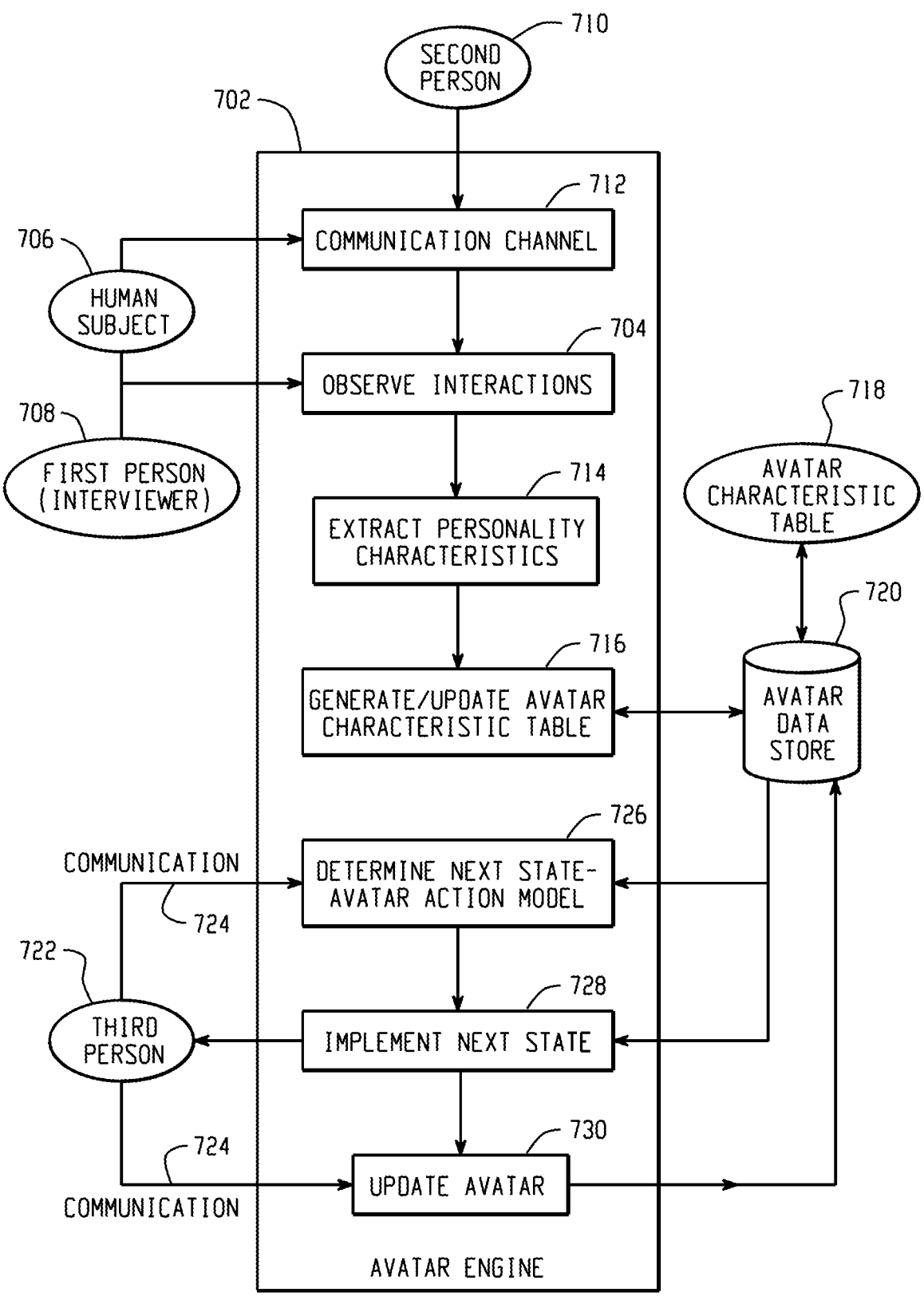
FIG. 7 is a block diagram depicting an avatar engine that develops an avatar model and implements an avatar for interaction with a third person.

FIG. 7 is a block diagram depicting an avatar engine that develops an avatar model and implements an avatar for interaction with a third person. The avatar engine 702 is configured to observe interactions 704 of a human subject 706. The observed interactions may take a variety of forms. For example, the avatar engine 702 may observe interactions of the human subject with a first person 708, such as an interviewer 708. Such observations may be via captured audio and video from a video camera. The avatar engine 702 may also observe interactions 704 of the human subject 706 with a second person 710 through a communication channel 712. For example, the avatar engine 702 may be configured to observe communications of the human subject 706 with the second person 710 through a video conferencing communication channel 712, such as Skype. Such interactions may be in interview form, or the observed interactions may be less formal in nature, such as observation of day-to-day voice chat conversations with acquaintances of the human subject 706.

Observation of communications outside of an interview atmosphere can aid in developing an accurate model of the human subject 706 for a variety of reasons. For example, the human subject 706 is more likely to invest time (e.g., over a period of years) in building their avatar if the process occurs non-invasively, behind the scenes, such as during activities in which the human subject 706 would normally be likely to participate. Moreover, if data collection is a background process, human subjects will be more likely to continue providing data, which can result in a more complex and accurate avatar through refinement of avatar personality characteristics, which can form an avatar that is more interesting to owners and users. Additionally, by obtaining data behind the scenes during activities that users already participate in (e.g., iChat, Skype, Facebook, gChat, Xbox Kinect, PS Move), a natural representation of an individual's personality on a day-to-day basis, as opposed to a staged interview, can be obtained.

To encourage the human subject 706 to utilize the communication channel 712 for communicating with other people 710, a free, reduced cost, or ad free version of the communication channel 712 can be offered to the human subject 706 for communicating with others 710 (e.g., an ad free version of Skype). As noted above, the more the human subject's interactions with others are observed, the more in-depth and accurate an avatar model can be developed. Because providing an avatar may be a pay-service, the cost of providing the communication channel 712 may be more than covered by revenues from providing avatars. Additionally, the provided communication channel 712 may offer an opportunity for offering avatar creation services to the second person 710 and others with whom the human subject 706 communicates using the channel. For example, before or after a conversation using the communication channel 712, the second user may be provided with an option to have observation data captured for generating an avatar of the second person 710. If the second person 710 is willing, then the conversation via the communication channel 712 could be observed for developing avatar personality characteristic values for both the human subject 706 and the second person 710 in a single session.

At 714, the avatar engine 702 extracts personality characteristics from the observed interactions 704. Those extracted personality characteristics are used at 716 to generate or update one or more avatar characteristic tables 718 stored in an avatar data store 720. As noted above, as the human subject 706 is observed more and more, the avatar personality characteristics stored in the avatar characteristic tables 718 are continually updated to provide a more accurate and in depth model of the human subject 706.

Data from the avatar characteristic tables 718 is used to implement an avatar for interaction with a third person requester 722. Upon request, an avatar of the human subject 706 is implemented according to avatar personality characteristic values stored in the avatar data store 720. The avatar may be initialized in an initial state, and subsequent states may be determined and implemented based on interactions with the third person 722. For example, a communication 724 may be received from the third person, such as a greeting or asking a question. At 726, the avatar engine 702 determines a next state for the avatar, such as through use of an avatar action model. For example, the avatar action model may determine a next state for the avatar based on behavioral or other data from the avatar characteristic tables 718, a current state of the avatar, and the communication 724 (including silence or no communication) from the third person 722. Upon determining the next state of the avatar, the avatar engine 702 implements that next state at 728 in a way that is discernible to the third person 722, such as through animation of a CGI avatar and output of sound. For example, the avatar action model may determine a series of gestures that the avatar should make and words that should be spoken in transitioning to the next avatar state 728. Data from the avatar data store 720 may be accessed to implement that next state. For example, phonemes for the determined words can be accessed to synthesize the words determined to be spoken in the voice of the human subject 706. Additionally, facial characteristics for expressions that are to be performed in the next avatar state may be accessed from the avatar data store 720 and rendered for display to the third person 722. At 730, the avatar may be updated based on the communication 724 from the third person 722 as well as the actions of the avatar represented in the determined state changes. By updating the avatar characteristic table 718 based on the communications 724 and avatar states, the avatar can generate a simulated memory, such that the avatar will appear to remember portions of conversations with the third person 722 during subsequent conversations with the third person 722 or others. Such avatar updating 730 also provides an avatar model the capability to learn based on avatar interactions.

Figure 8:
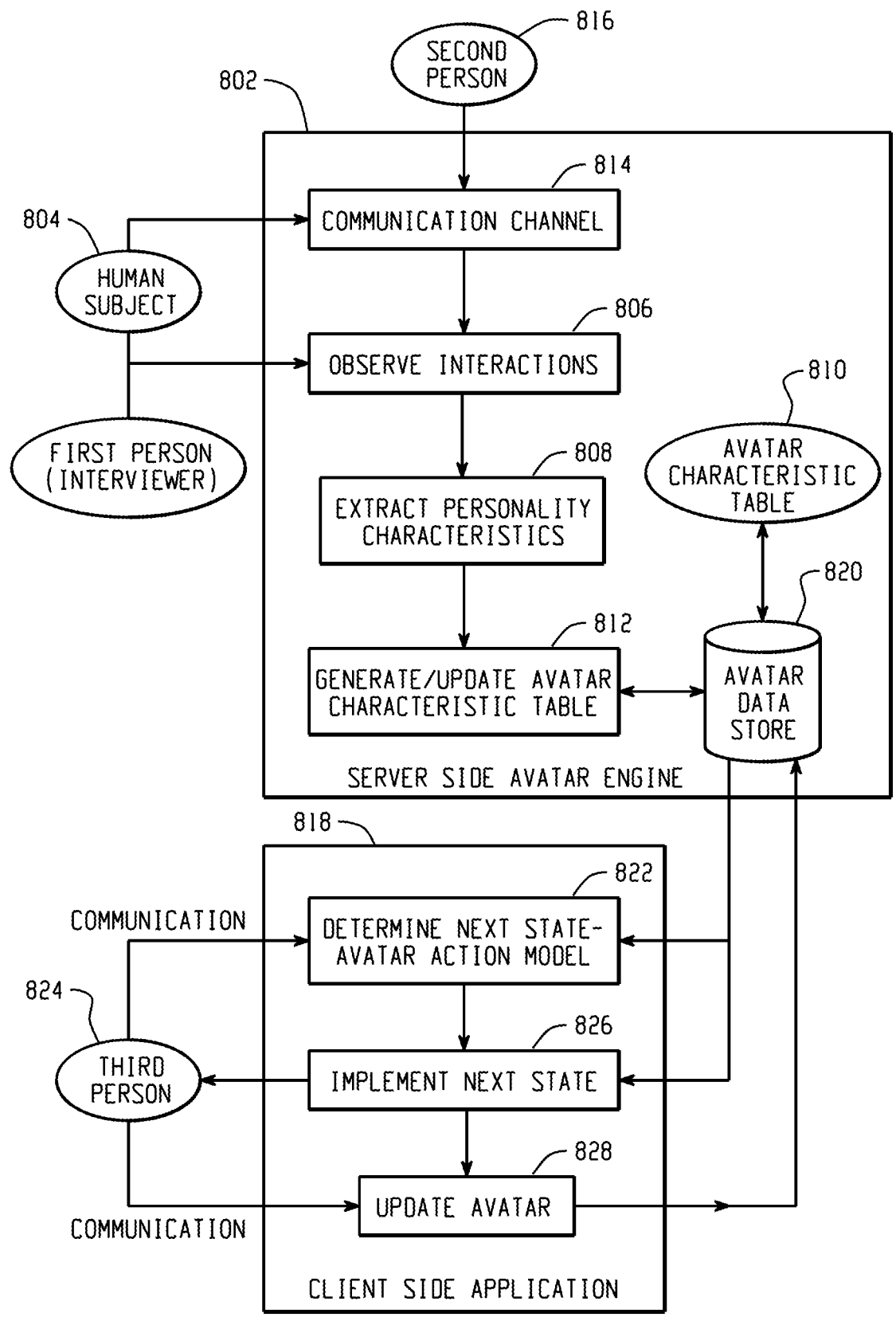
FIG. 8 is a block diagram depicting example client side processing of certain avatar operations.

FIG. 8 is a block diagram depicting example client side processing of certain avatar operations. Many avatar operations can be executed via client side applications, which can reduce stress on avatar engine 802 hardware. In one example, an avatar engine 802 may be implemented on a server, which provides actual implementation of certain avatar generation and updating operations for a human subject 804, such as observing interactions 806 of the human subject 804, extracting personality characteristics 808 and updating avatar characteristic tables 810, as shown at 812. Additionally, in one example, the server side avatar engine 802 may implement the communication channel 814, where the human subject 804 can communicate with a second party 816, while the avatar engine 802 observes those interactions at 806 and updates the avatar characteristic table 810 accordingly.

To alleviate loads on the avatar engine server 802, certain avatar operations can be performed client side. For example, avatar state decisions and avatar implementation can be performed client side, such as via a client application or web application. In one example, a client side application 818 receives avatar personality characteristic and other data from an avatar data store 820 and uses that data to determine next states of the avatar at 822, such as based on communications from a third person 824. The client side application 818 renders the avatar to implement the next state at 826 and determines updates to the avatar characteristic tables 810 at 828. At the end of an avatar interaction session, the client side application may forward the determined updates to the avatar to the server for storage in the avatar characteristic table 810 and access in subsequent sessions. In such a configuration, data transmission between the server 802 and client 818 is limited to transmission of avatar data at the beginning of a session from the server 802 to the client 818 and the transmission of updates from the client 818 to the server 802 at the conclusion of a session.

Other arrangements may similarly be implemented. For example, the communication channel 814 may be implemented client side via downloadable applications. The communication channel applications 814 may observe interactions of the human subject 804 during a video call to the second person 816. At the conclusion of the video call, the client side communication channel 814 application may send the observation data to the server side avatar engine 802, where personality and other characteristics are extracted and used to populate or update avatar characteristic tables 810 in the avatar data store 820.

Figure 9:
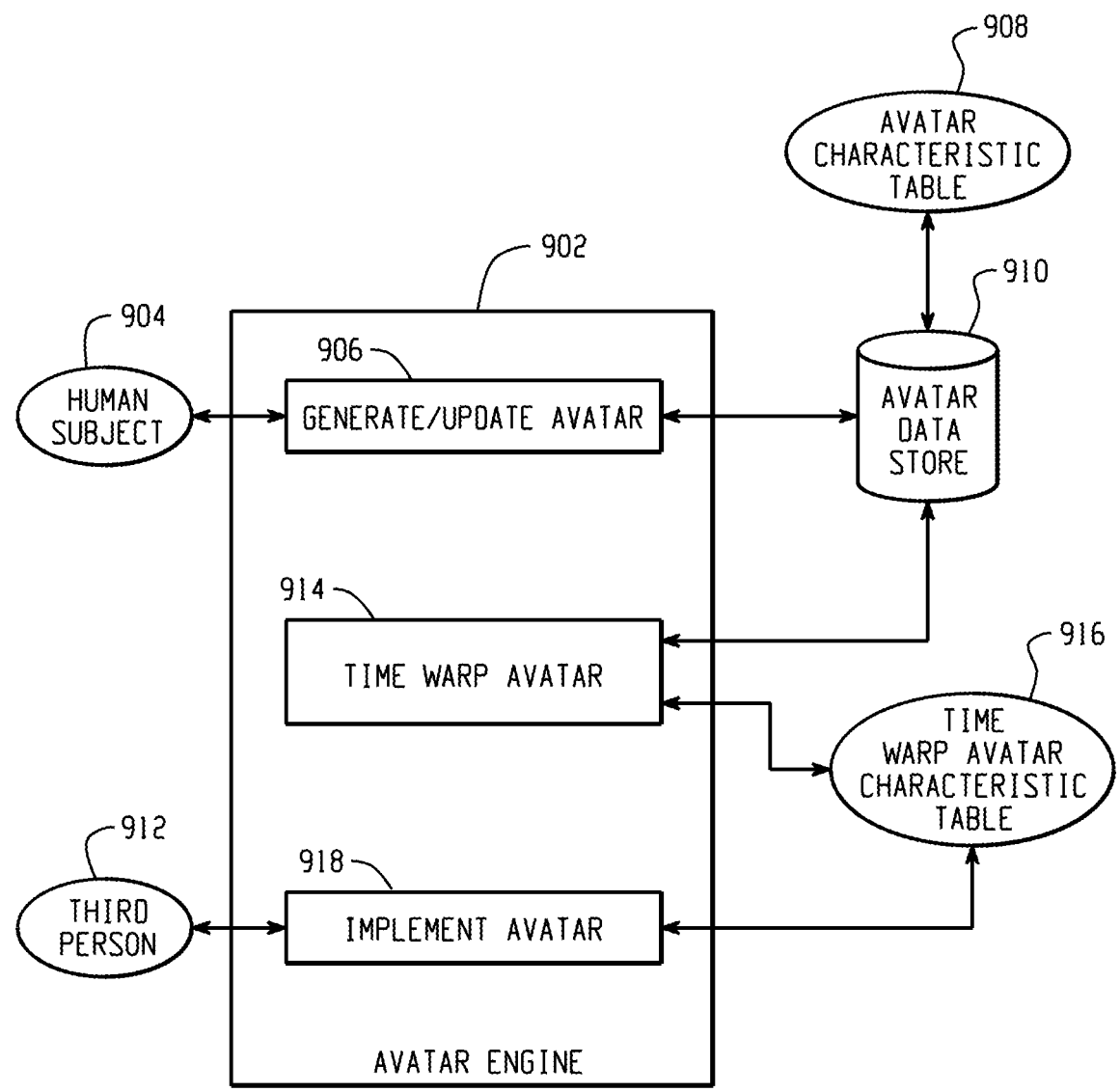
FIG. 9 is a block diagram depicting an avatar engine configured to perform a time warp operation.

FIG. 9 is a block diagram depicting an avatar engine configured to perform a time warp operation. As described above, a representation of an avatar through avatar personality characteristics can be modified based on a variety of interactions, such as observed interactions between the human subject and an interview, between the human subject and other people, between the avatar and third party users, and between the avatar and other avatars. In some instances, it may be desirable to develop an avatar that is adjusted based on a desired period of time. For example, a requesting user may wish to interact with an avatar that depicts what the human subject might have been like 10 years ago. In another example, a requesting user may request to interact with an avatar that depicts what the human subject might be like in 35 years time. The avatar engine of FIG. 9 is configured to perform such operations. The avatar engine 902 performs certain operations, such as certain of those described above, with respect to a human subject 904 to generate and update an avatar at 906 that is representative of the human subject. The human subject 904 is represented by avatar personality characteristics stored in an avatar characteristic table 908 stored in an avatar data store 910.

Upon receipt of a request from a third person 912 (or the human subject) or upon certain visual or audio inputs, the avatar engine performs a time warp operation at 914 to generate a time warped representation of the human subject 904. The time warped representation of the human subject can be created through generation of a time warp avatar characteristic table 916 that adjusts the avatar personality characteristics of the human subject 904 such that the avatar represents the human subject as they might have existed, or as they may exist, during the time period requested by the third person 912. Having generated the time warp avatar characteristic table 916, the time warped avatar can be implemented 918 using techniques described herein for implementing a current avatar for interaction with the third person 912.

The generation of the time warp avatar characteristic table 916 can be performed in a variety of ways. In one example, where a human subject 904 has been observed over a long range of time, the time warp avatar characteristic table 916 can be generated to represent the human subject 904 at different points in that range by referencing prior states of the avatar characteristic table 908 at the desired time. For example, if the human subject 904 has been observed from 2000-2012, and the third person 912 requests to interact with an avatar of what the human subject 904 was like in 2004, the time warp avatar characteristic table 916 can be created by loading a version of the avatar characteristic table 908 for the human subject 904 as it existed in 2004.

Other mechanisms may be used, especially when the requested time warp is outside of the period of observation of the human subject 904. In one example, certain characteristics of the human subject stored in the avatar characteristic table can be interpolated, linearly or otherwise. For example, when performing a time warp operation 914 to age an avatar, a hair color avatar personality characteristic may be adjusted to a grayer value according to the length of time in the future that the avatar is to be warped. Additionally, certain behavioral traits, such as patience traits, may be adjusted with age in the generated time warp avatar characteristic table 916. In a more sophisticated time warping operation, correlations may be determined between the human subject 904 and other subjects based on commonalities between personality characteristics stored in the avatar characteristic table. When high correlation candidates are identified, changes in those candidates' characteristics over time can be imparted to the human subject 904 to approximate how the human subject's characteristics might change over time. For example, when a request to depict an avatar of a future representation of a human subject who is a child who tends to misbehave is received, other subjects who misbehaved as a child may be identified as correlation candidates. Changes in the correlation candidates' characteristics over the requested time period (e.g., what might the misbehaving child be like in 30 years) are imparted to the human subject 904 through similar adjustments to the avatar characteristic table 908 in generating the time warp avatar characteristic table. While a misbehaving child may be correlated with other subjects who ended up living a life of crime, a well behaved child may be correlated with more successful correlation candidates. Thus, the modifications to the misbehaving child's characteristics in generating a time warp avatar characteristic table 916 may be vastly different than modifications made to a better behaving child.

Similar extrapolations by comparison to correlated individuals could be made into the past. Additional materials related to the human subject 904 can be utilized in enhancing the "back-in-time" avatar representation. For example, earlier time period photos of the human subject 904 (e.g., photos extracted from social media postings by the human subject 904) can be utilized to provide an even more realistic depiction of the human subject in avatar form than might be possible using interpolation methods alone.

In a further implementation, a time warp avatar characteristic table 916 could be generated at 914 through simulation. A current state of an avatar, as represented by the avatar characteristic table 908 could be simulated through a life for a period of time requested by the third person 912. Such simulation could include interaction with other avatars, as represented by their avatar characteristic tables, and application of certain aging function. As the avatar interacts with others and ages through the simulation, its avatar personality characteristic values are adjusted, ultimately resulting in the time warp avatar characteristic table 916 used to implement an avatar 918 for interaction with the third person 912. In some embodiments, the avatar's life may be simulated multiple times, with averages of the simulated avatar characteristic table values being used to generate the time warp avatar characteristic table 916 used to implement the avatar at 918.

Figure 10:
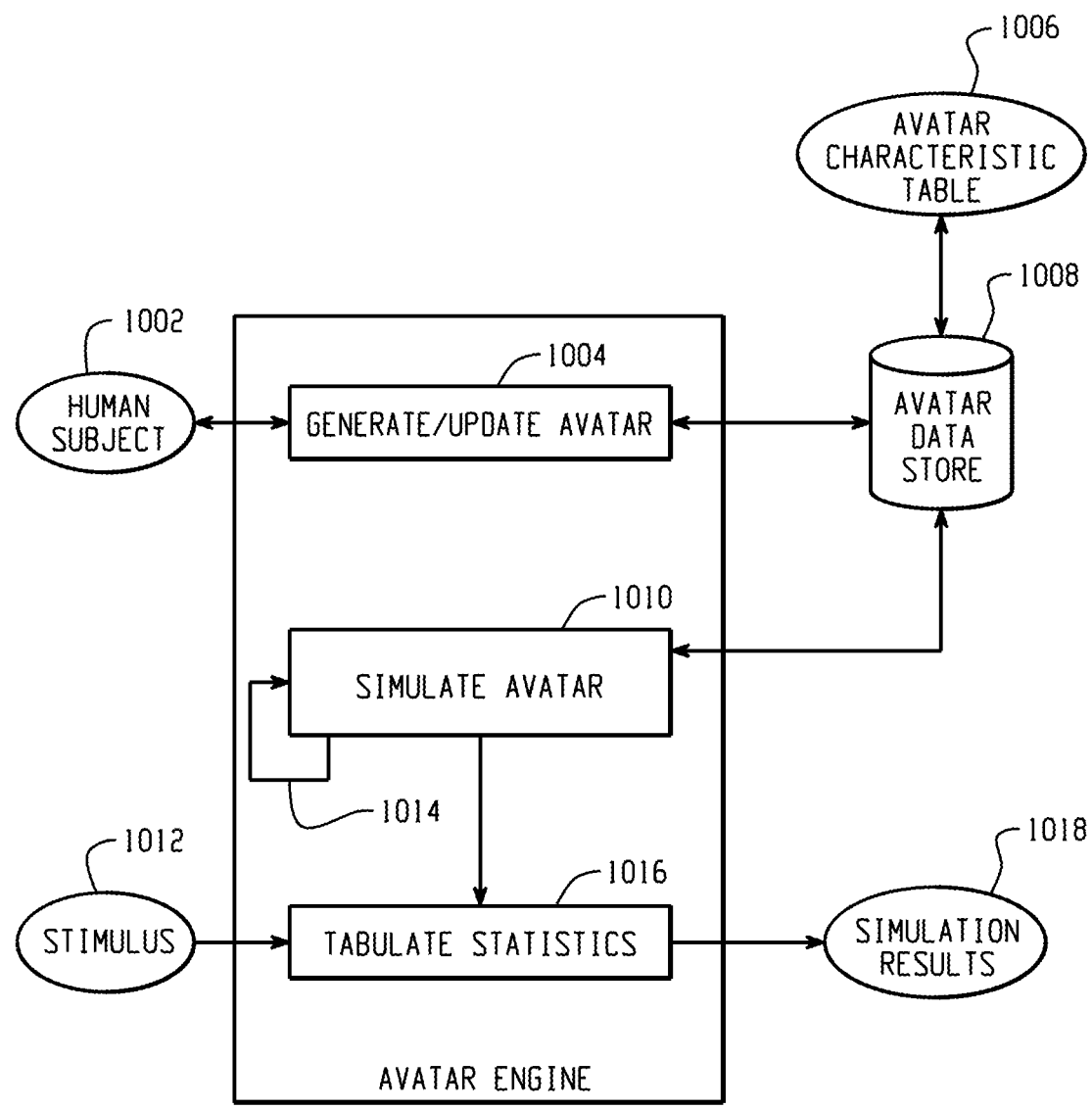
FIG. 10 is a block diagram depicting an avatar engine configured to perform avatar simulation.

FIG. 10 is a block diagram depicting an avatar engine configured to perform avatar simulation. Avatar simulation data may be useful in a variety of contexts. For example, avatar simulation could be useful in identifying personality conflicts before they happen. In one implementation, avatar simulation could be used in a military application to predict the ability of troops to interact positively with one another, especially in stressful situations. Avatars for a number of soldier human subjects 1002 can be generated and updated at 1004 to create models that are stored as avatar characteristic tables 1006 in an avatar data store 1008. Behavior of an avatar can be simulated at 1010 by implementing the avatar and monitoring its interactions with a stimulus 1012. In the military example, the stimulus could include avatars of other troops with whom the human subject 1002 might be assigned and a number of stressful scenarios in which the human subject 1002 and the other troops could encounter. The interactions of the avatar of the human subject 1002 and other avatars are observed, in some cases over many iterations, as indicated at 1014. Statistics are tabulated at 1016 based on those observations to generate results 1018. The results may indicate a number of things, such as an estimated probability that a particular group of troops will interact properly together when put into a stressful situation, such as a number of sailors being stationed on a submarine for a long period of time. Additional results 1018 could include analysis of changes to the avatar's personality over the simulation time period, as evidenced by changes to the avatar characteristic table values 1006 from the start of the simulation to the end of the simulation. Certain changes to values could indicate a higher possibility of adverse outcomes, such as post-traumatic stress disorder, when the human subject 1002 is assigned to work with particular combinations of other troops.

Similar simulations could be utilized to predict other group dynamics as well. For example, such simulations could be used in evaluating players on a sports team, where a general manager of a team may wish to predict how a new player might interact with present players when evaluating whether to invite the new player to join his team. Similar simulations could be used in more traditional work environments to forecast how a prospective employee is likely to affect present group dynamics.

Simulation can also be used for entertainment purposes. For example, simulation can be used to create entertainment videos, such as movies. For example, an avatar of a human subject 1002 could be simulated with a stimulus 1012 that includes other avatars, and the results of the simulation could be recorded as a video of the avatars interacting. Speech, gestures, and other movement could be recorded from multiple angles and saved for viewing by the human subject or others 1002. For example, such simulated encounters could be placed onto a social media site, such as YouTube for viewing by others and potential revenue generation by the video creator. As another example, such simulations could be utilized as part of a game where a human subject 1002 simulates how well or poorly he would interact with celebrities or historical figures. Interaction of the human subject's avatar with the celebrity or historical figure avatars could be saved for viewing as a video and scored for comparison with other human subjects' avatar experiences.

Simulation may also be used to predict how a human subject 1002 will react to stimuli other than other people. For example, a marketing executive may wish to predict how the human subject will react to a new marketing campaign. Using the avatar engine depicted in FIG. 10, the avatar of the human subject 1002 can be provided the marketing campaign stimulus 1012, and the avatar's reaction to the marketing campaign can be observed. As indicated at 1014, several iterations of the experiment may be run. As noted above, an avatar may respond differently in different runs of the experiment, even when presented with an identical stimulus 1014 (e.g., based on a random number selected in referencing a probability table). Thus, it may be useful to rerun the experiment a number of times to get a sample of the avatar's reactions. Based on the observations of the avatar's reaction, statistics are tabulated at 1016 indicating the likelihood that the human subject will react positively to the marketing campaign stimulus 1012. Presentation of the marketing campaign stimulus 1012 could be performed for many human subjects' avatars to generate an indication of how a population is likely to react to the campaign.

While simulating and otherwise providing interaction with single human subject avatars may have significant value, in certain circumstances, additional value can be achieved through use of composite or aggregate avatars that represent the collective attributes of multiple human subjects. For example, an aggregate avatar may be generated based on individual avatars for a sample of people in a target demographic. A stimulus, such as a marketing campaign, could be provided to that aggregate avatar to ascertain a likely reaction of the "average person" in that target demographic to the stimulus.

Figure 11:
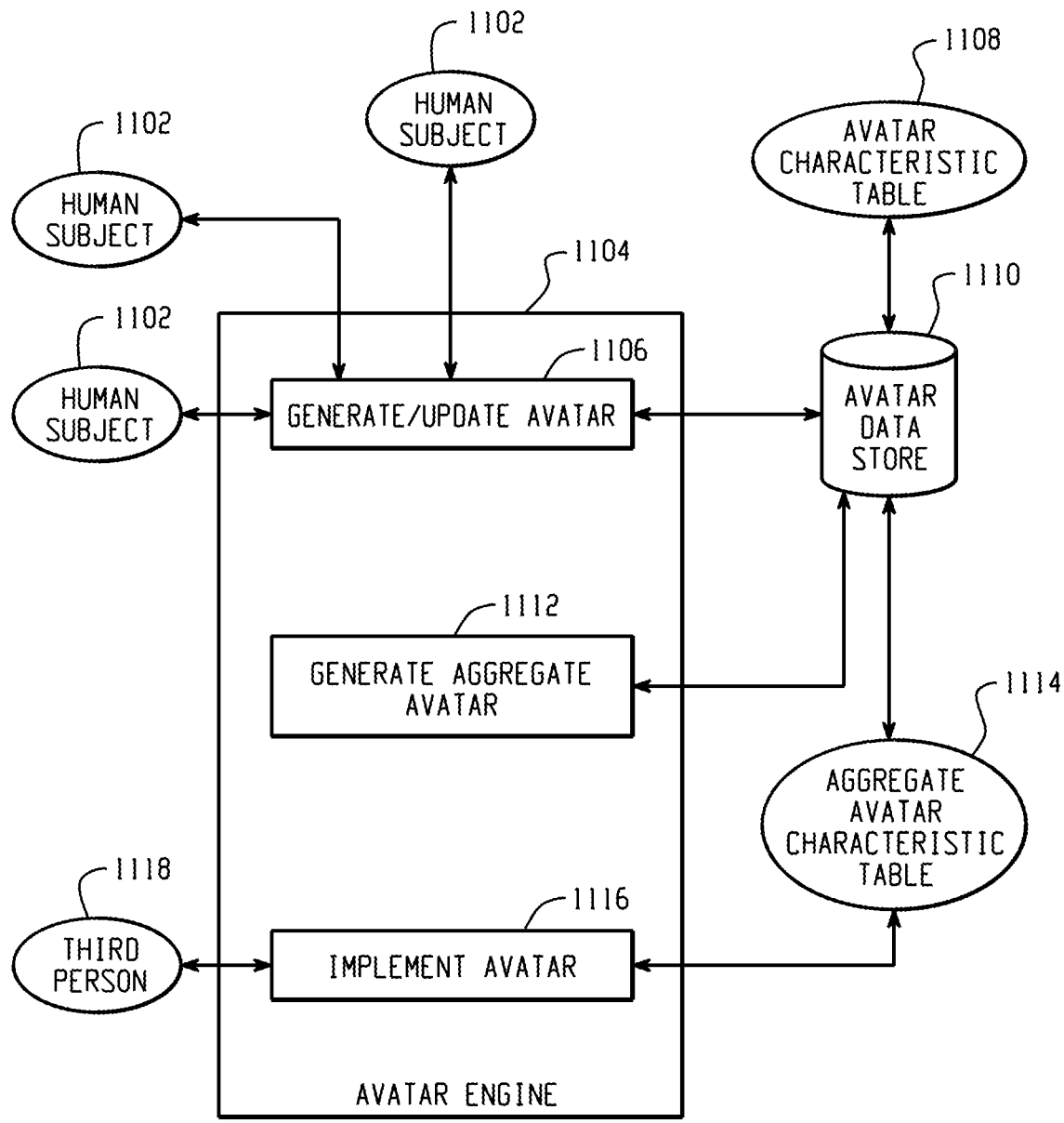
FIG. 11 is a block diagram depicting the generation of an aggregate avatar for implementation.

FIG. 11 is a block diagram depicting the generation of an aggregate avatar for implementation. A number of human subjects 1102 interact with an avatar engine 1104 to generate individual avatars at 1106 for each of the human subjects 1102. Each of the individual avatars may be captured via one or more avatar characteristic tables 1108 stored in an avatar data store 1110. At 1112, an aggregate avatar is generated based on the individual avatar data stored in the avatar characteristic tables 1108 and stored as aggregate avatar characteristic table 1114 data. In one example, the aggregate avatar characteristic table 1114 is formed using an average of data for different avatar personality characteristics across the population of human subjects 1102 of interest. In other implementations, certain human subjects may be weighted differently from others in generating the aggregate avatar. The aggregate avatar may be implemented at 1116.

As noted above, the implementation of the aggregate avatar at 1116 can be used to determine a likely reaction of an average person in a target group to a stimulus. In other implementations, the aggregate avatar may be implemented for interaction with a third person 1118. For example, an aggregate avatar could be used in a teaching, training, or testing context. For example, the aggregate avatar characteristic table 1114 could be generated based on avatar data from a sample of avatars associated with human subjects 1102 having certain mental health deficiencies (e.g., 1,000 patients suffering from schizophrenia). The third person 1118 could be a medical student being trained or tested, where interactions between the medical student 1118 and the implemented aggregate avatar are observed to study the appropriateness of the medical student's actions. In this way the third person medical student 1118 could be evaluated or further instructed based on interactions with the simulated average person having mental disorders.

Aggregate avatars could be useful in many other contexts as well. For example, an aggregate avatar could be generated based on avatar personality characteristics of each of a sample of criminals. The aggregate avatar could be implemented to interact with a detective in training to simulate an interrogation. Using such simulations, the trainee-detective could explore what sorts of techniques are likely to work with different types of criminals through interactions with the aggregate avatars.

Figure 12:
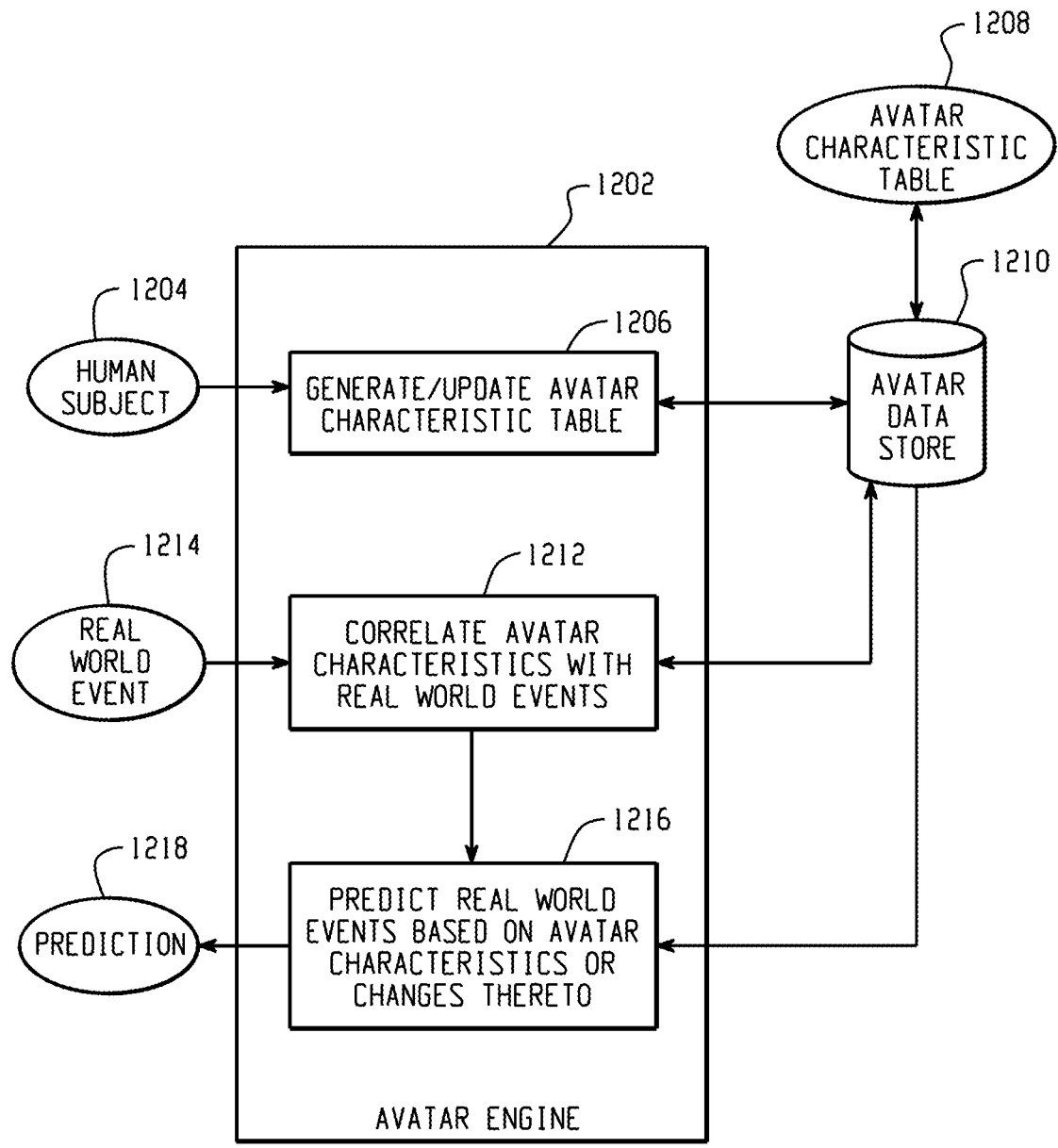
FIG. 12 is a block diagram depicting generation of a prediction based on avatar characteristic table values.

Many other benefits may be achieved through interaction with an avatar engine. FIG. 12 is a block diagram depicting generation of a prediction based on avatar characteristic table values. In FIG. 12, an avatar engine 1202 observes a human subject 1204 to generate at 1206 an avatar characteristic table 1208, which is stored in an avatar data store 1210. The avatar characteristic table 1208 may be adjusted over time based on subsequent observations of the human subject 1204 or interactions of an avatar based on the avatar characteristic table 1208 with certain stimuli. Each iteration of the avatar characteristic table 1208 may be saved as a time series snapshot of the human subject. At 1212, the time series snapshots of the human subject 1204, as represented by the avatar characteristic table 1208 captures are correlated with real world event data 1214. In one example, the time series avatar characteristic table data 1208 is correlated with trading prices of a tradable commodity, such as a stock price. Such correlations may reveal a variety of things. For example, the human subject's mood, as represented by certain avatar personality characteristic values in the tables 1208 may be inversely related to a stock price. At 1216, a real world event is predicted 1218 based on the avatar characteristics, or changes thereto, in light of the correlations discovered at 1212. For example, if the human subject's mood is trending downward, as indicated by changes in avatar characteristic table 1208, then the avatar engine 1202 may predict 1218 that the stock price will go up. An action may then be taken based on the prediction 1218, such as buying the stock in hopes of a gain being realized based on actualization of the prediction 1218. The prediction operations described with reference to FIG. 12 could be repeated over a population of human subjects' avatar characteristic tables (e.g., CEOs of a top 100 companies) to discover a consensus predictions. The prediction operations of FIG. 12 could further be performed based on an avatar characteristic table associated with an aggregate avatar, such as using an aggregate avatar characteristic table.

Figure 13:
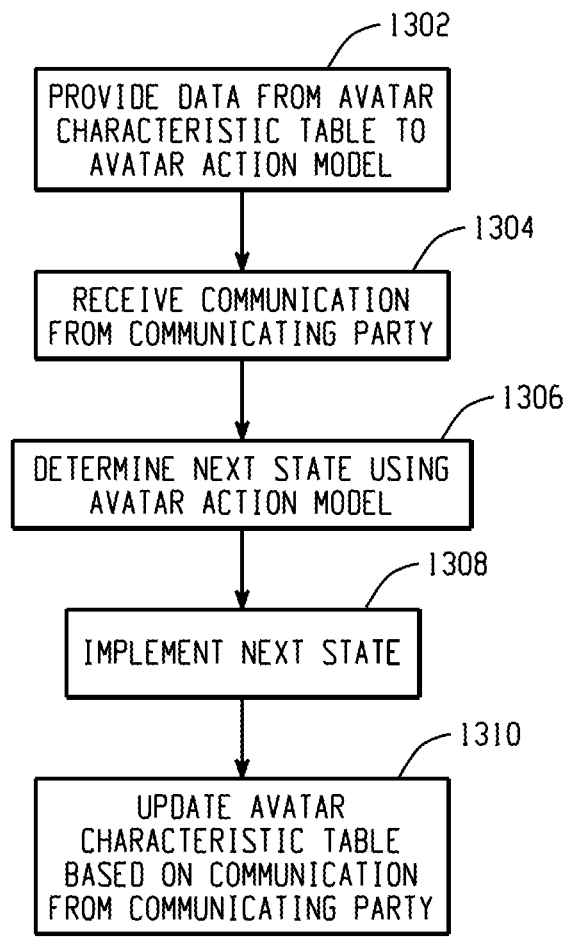
FIG. 13 is a flow diagram depicting an example method of providing an interactive avatar that reacts to communication from a communicating party.

FIG. 13 is a flow diagram depicting an example method of providing an interactive avatar that reacts to communication from a communicating party. At 1302, data from an avatar characteristic table is provided to an avatar action model, where the avatar characteristic table is a data structure stored on a computer-readable medium that includes values for a plurality of avatar personality characteristics. A communication with the avatar is received at 1304 from the communicating party. At 1306, a next state for the avatar is determined using the avatar action model, where the avatar action model determines the next state based on the data from the avatar characteristic table, a current state of the avatar, and the communication. At 1308, the next state for the avatar is implemented, where the implemented next state is made discernible to the communicating party, and at 1310, the avatar characteristic table is updated based on the communication from the communicating party, where a subsequent state for the avatar is determined based on the updated avatar characteristic table.

Figure 14:
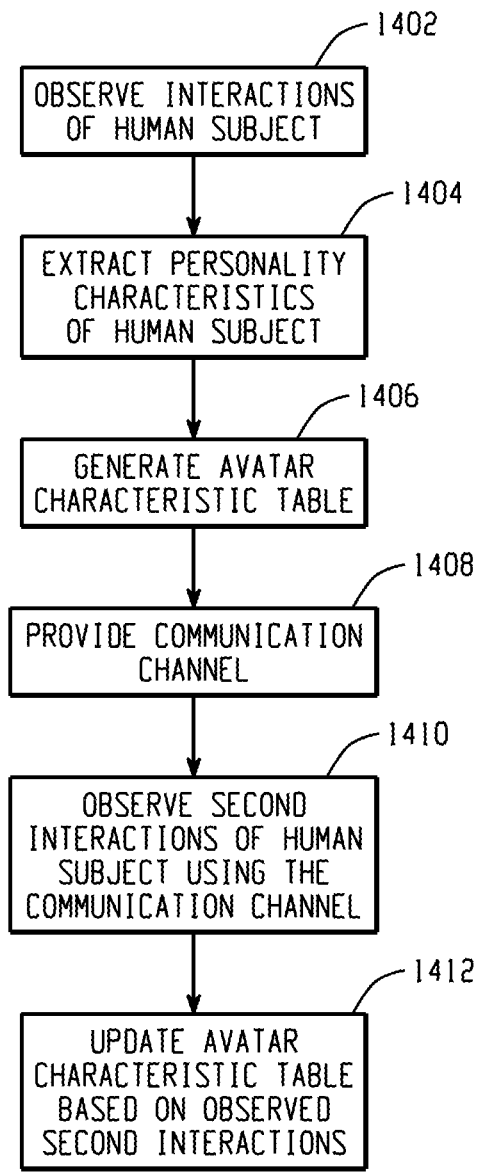
FIG. 14 is a flow diagram depicting an example method of providing an interactive avatar configured to represent traits of a human subject.

FIG. 14 is a flow diagram depicting an example method of providing an interactive avatar configured to represent traits of a human subject. At 1402, first interactions of the human subject with a first person or with an avatar are observed. Personality characteristics of the human subject are extracted at 1404 from the observed first interactions. At 1406, an avatar characteristic table is generated or updated based on the extracted personality characteristics. A communication channel is provided at 1408 for the human subject to use to communicate with other people. At 1410, second interactions of the human subject with a second person are observed using the provided communication channel, and at 1412, the avatar characteristic table is updated based on the observed second interactions, where an avatar is provided for interaction with a communicating party, and where actions of the provided avatar are based on the avatar characteristic table.

FIGS. 15A, 15B, and 15C depict example systems for use in implementing an avatar engine. For example, FIG. 15A depicts an exemplary system 1500 that includes a standalone computer architecture where a processing system 1502 (e.g., one or more computer processors located in a given computer or in multiple computers that may be separate and distinct from one another) includes an avatar engine 1504 being executed on it. The processing system 1502 has access to a computer-readable memory 1506 in addition to one or more data stores 1508. The one or more data stores 1508 may include avatar characteristic table data 1510 as well as simulation results 1512.

FIG. 15B depicts a system 1520 that includes a client server architecture. One or more user PCs 1522 access one or more servers 1524 running an avatar engine 1526 on a processing system 1527 via one or more networks 1528. The one or more servers 1524 may access a computer readable memory 1530 as well as one or more data stores 1532. The one or more data stores 1532 may contain avatar characteristic table data 1534 as well as simulation results 1536.

FIG. 15C shows a block diagram of exemplary hardware for a standalone computer architecture 1550, such as the architecture depicted in FIG. 15A that may be used to contain and/or implement the program instructions of system embodiments of the present invention. A bus 1552 may serve as the information highway interconnecting the other illustrated components of the hardware. A processing system 1554 labeled CPU (central processing unit) (e.g., one or more computer processors at a given computer or at multiple computers), may perform calculations and logic operations required to execute a program. A non-transitory processor-readable storage medium, such as read only memory (ROM) 1556 and random access memory (RAM) 1558, may be in communication with the processing system 1554 and may contain one or more programming instructions for implementing an avatar engine. Optionally, program instructions may be stored on a non-transitory computer readable storage medium such as a magnetic disk, optical disk, recordable memory device, flash memory, or other physical storage medium.

A disk controller 1560 interfaces one or more optional disk drives to the system bus 1552. These disk drives may be external or internal floppy disk drives such as 1562, external or internal CD-ROM, CD-R, CD-RW or DVD drives such as 1564, or external or internal hard drives 1566. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1560, the ROM 1556 and/or the RAM 1558. Preferably, the processor 1554 may access each component as required.

A display interface 1568 may permit information from the bus 1552 to be displayed on a display 1570 in audio, graphic, or alphanumeric format. Communication with external devices may optionally occur using various communication ports 1572.

In addition to the standard computer-type components, the hardware may also include data input devices, such as a keyboard 1573, or other input device 1574, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method comprising:
   receiving, by a processor-based system, a video recording of a human subject including captured physical characteristics and phoneme pronunciations of the human subject, wherein the video recording has both audio of the human subject and a visual representation of the human subject;
   generating, by the processor-based system, a personality model comprising a Markov decision process based on the video recording, the personality model corresponding to the human subject;
   extracting, by the processor-based system, from the video recording, and storing in an avatar characteristic table:
      appearance simulating the human subject based on the physical characteristics of the human subject,
      voice simulating the human subject based on the phoneme pronunciations by the human subject,
      movement behavior that is characteristic of the human subject based on the physical characteristics of the human subject,
      speech behavior that is characteristic of the human subject based on the phoneme pronunciations by the human subject, and
      attitude that is characteristic of the human subject;
   conducting a conversation with a user using the personality model, the conducting a conversation comprising:
      receiving, by the processor-based system, a communication from a user;
      generating, by the processor-based system, a probability table that identifies the probability that the human subject would exhibit a particular type of response based on the avatar characteristic table and a current context of the conversation;
      determining a next state using the personality model, the next state based on the determined attitude, a random number, and the probability table, the next state comprising a response to the communication;
      rendering, by the processor-based system to the user, an avatar speaking the response, with the avatar speaking with the determined voice and the determined speech behavior and appearing with the determined appearance and moving with the determined movement behavior;
      receiving a reply from the user; and
      updating the avatar characteristic table based on the communication from the user, the response from the avatar, and the reply from the user;
   wherein a future conversation is conducted using the updated avatar characteristic table that has an augmented memory based on the conversation that manifests itself in future avatar spoken responses in the future conversation.

2. The method of claim 1, wherein the inputting of the video recording is through a video camera in an interview in which the human subject answers questions configured to elicit characteristics of the human subject.

3. The method of claim 1, wherein the movement behavior includes at least one of hand movement, eye movement, mouth movement, arm movement, stance and gait.

4. The method of claim 1, wherein the speech behavior includes at least one of speaking rate, cadence and inflection.

5. The method of claim 1, wherein the attitude includes at least one of an idea, a philosophy, and annoyance.

6. The method of claim 1, wherein the formulating of the response uses vocabulary and phrases gleaned by the processor-based system from the video recording.

7. The method of claim 1, wherein the presenting of the avatar includes piecing together, into an audio stream, voice segments taken from the video recording.

8. The method of claim 7, wherein the presenting of the avatar includes piecing together, into a video stream, visemes taken from the video recording.

9. The method of claim 1, wherein the presenting of the avatar includes piecing together, into a video stream, video segments taken from the video recording.

10. The method of claim 1, wherein the communication from the user is a question.

11. The method of claim 1, wherein the formulating of the response is based on likelihoods of types of responses the human subject would provide based on the determined attitude.

12. The method of claim 1, wherein the rendering includes aging the avatar such that the avatar's appearance is adjusted to what the human subject might appear like in the future.

13. The method of claim 1, wherein the rendering includes aging the avatar such that the avatar's attitude is adjusted to what the human subject's attitude might be in the future.

14. The method of claim 1, wherein the communication is a first communication, and the response is a first response, and wherein the method further comprises:

receiving, by the processor-based system, a second communication from the user;
formulating, by the processor-based system in response to the second communication, a second response based on (i) the first communication, (ii) the first response and (iii) the second communication; and
presenting, by the processor-based system to the user, the avatar speaking the second response, with the avatar speaking with the determined voice and the determined speech behavior and appearing with the determined appearance and moving with the determined movement behavior.

15. The method of claim 1, wherein the human subject is a first human subject, the avatar is a first avatar, the inputting of the video recording is performed during interaction of the first human subject with a second human subject, and wherein the method further includes:
   inputting, by the processor-based system during the interview, the video recording of the second human subject;
   determining, by the processor-based system, from the video recording of the second subject:
      appearance simulating the second human subject,
      voice simulating the second human subject,
      movement behavior that is characteristic of the second human subject,
      speech behavior that is characteristic of the second human subject, and
      attitude that is characteristic of the second human subject; and
   presenting, by the processor-based system, a second avatar speaking a response, with the second avatar speaking with the determined voice and the determined speech behavior and appearing with the determined appearance and the determined movement behavior.

16. The method of claim 1, further comprising:
   presenting, by a communication device of the user, the avatar as a ringtone indicating receipt of an incoming call from the human subject.

17. The method of claim 1, further comprising:
   presenting, by the processor-based system, the avatar speaking a message sent from the human subject, with the avatar speaking with the determined voice and the determined speech behavior and appearing with the determined appearance and moving with the determined movement behavior.

18. The method of claim 17, wherein the message is a text message.

19. The method of claim 1, wherein the processor-based system includes a smart phone of the user, and the presenting of the avatar is performed by the smart phone.

20. The method of claim 1, wherein the processor-based system includes a smart phone of the user, and wherein the method includes:
   the smart phone implementing a phone call between the user and the human subject; and
   the smart phone presenting the avatar lip-syncing words being said by the human subject, with the avatar appearing with the determined appearance and moving with the determined movement behavior.

21. The method of claim 1, wherein the processor-based system includes a communication device of the user, and wherein the method includes:
   the communication device implementing a conversation between the user and another person who is not the human subject; and
   the smart phone presenting the avatar lip-syncing words being said by the other person, with the avatar appearing with the determined appearance and moving with the determined movement behavior.

22. The method of claim 21, wherein avatar speaks the words being said by the other person, with the avatar speaking with the determined voice and the determined speech behavior.

23. The method of claim 1, wherein:
   the presenting of the avatar is part of a conversation between the human subject and the user, and wherein the method further comprises:
   the processor-based system observing the conversation, and
   based on the observation, the processor-based system, during the course of the conversation, updating the determinations of the appearance, the voice, the movement behavior and the speech behavior.

24. The method of claim 23, wherein:
   the avatar's voice, appearance, movement behavior and speech behavior, as presented by the processor-based system, change during the course of the conversation based on the updates in the determinations.

25. A non-transient processor-readable medium storing instructions configured to be executed by one or more processors to perform steps of:
   receiving, by a processor-based system, a video recording of a human subject including captured physical characteristics and phoneme pronunciations of the human subject wherein the video recording has both audio of the human subject and a visual representation of the human subject;
   generating, by the processor-based system, a personality model comprising a Markov decision process based on the video recording, the personality model corresponding to the human subject;
   extracting, by the processor-based system, from the video recording, and storing in an avatar characteristic table:
      appearance simulating the human subject based on the physical characteristics of the human subject,
      voice simulating the human subject based on the phoneme pronunciations by the human subject,
      movement behavior that is characteristic of the human subject based on the physical characteristics of the human subject,
      speech behavior that is characteristic of the human subject based on the phoneme pronunciations by the human subject, and
      attitude that is characteristic of the human subject;
   conducting a conversation with a user using the personality model, conducting a conversation comprising:
      receiving, by the processor-based system, a communication from a user;
      generating, by the processor-based system, a probability table that identifies the probability that the human subject would exhibit a particular type of response based on the avatar characteristic table and a current context of the conversation;
      determining a next state using the personality model, the next state based on the determined attitude, a random number, and the probability table, the next state comprising a response to the communication;
      rendering, by the processor-based system to the user, an avatar speaking the response, with the avatar speaking with the determined voice and the determined speech behavior and appearing with the determined appearance and moving with the determined movement behavior;
      receiving a reply from the user; and updating the avatar characteristic table based on the communication from the user, the response from the avatar, and the reply from the user;

wherein a future conversation is conducted using the updated avatar characteristic table that has an augmented memory based on the conversation that manifests itself in future avatar spoken responses in the future conversation.

26. A processor-based system configured to perform steps of:

receiving, by a processor-based system, a video recording of a human subject including captured physical characteristics and phoneme pronunciations of the human subject wherein the video recording has both audio of the human subject and a visual representation of the human subject;

generating, by the processor-based system, a personality model comprising a Markov decision process based on the video recording, the personality model corresponding to the human subject;

extracting, by the processor-based system, from the video recording, and storing in an avatar characteristic table:
   appearance simulating the human subject based on the physical characteristics of the human subject,
   voice simulating the human subject based on the phoneme pronunciations by the human subject,
   movement behavior that is characteristic of the human subject based on the physical characteristics of the human subject,
   speech behavior that is characteristic of the human subject based on the phoneme pronunciations by the human subject, and
   attitude that is characteristic of the human subject;

conducting a conversation with a user using the personality model, conducting a conversation comprising:
   receiving, by the processor-based system, a communication from a user;
   generating, by the processor-based system, a probability table that identifies the probability that the human subject would exhibit a particular type of response based on the avatar characteristic table and a current context of the conversation;
   determining a next state using the personality model, the next state based on the determined attitude, a random number, and the probability table, the next state comprising a response to the communication;
   rendering, by the processor-based system to the user, an avatar speaking the response, with the avatar speaking with the determined voice and the determined speech behavior and appearing with the determined appearance and moving with the determined movement behavior;
   receiving a reply from the user; and
   updating the avatar characteristic table based on the communication from the user, the response from the avatar, and the reply from the user;

wherein a future conversation is conducted using the updated avatar characteristic table that has an augmented memory based on the conversation that manifests itself in future avatar spoken responses in the future conversation.

27. A method comprising:

receiving, by a processor-based system, a video recording of a human subject including captured physical characteristics and phoneme pronunciations of the human subject, wherein the video recording has both audio of the human subject and a visual representation of the human subject;

generating, by the processor-based system, a personality model comprising a Markov decision process based on the video recording, the personality model corresponding to the human subject;

extracting, by the processor-based system, from the video recording, and storing in an avatar characteristic table:
   appearance simulating the human subject based on the physical characteristics of the human subject,
   voice simulating the human subject based on the phoneme pronunciations by the human subject,
   movement behavior that is characteristic of the human subject based on the physical characteristics of the human subject,
   speech behavior that is characteristic of the human subject based on the phoneme pronunciations by the human subject, and
   attitude that is characteristic of the human subject;

conducting a first conversation with a user using the personality model, conducting a first conversation comprising:
   receiving, by the processor-based system, a communication from a user;
   determining a next state using the personality model, the next state based on the determined attitude, a random number, and the probability table, the next state comprising a response to the communication;
   rendering, by the processor-based system to the user, an avatar speaking the response, with the avatar speaking with the determined voice and the determined speech behavior and appearing with the determined appearance and moving with the determined movement behavior;
   receiving a reply from the user; and
   updating the avatar characteristic table based on the communication from the user, the response from the avatar, and the reply from the user;

wherein a future conversation is conducted using the updated avatar characteristic table that has an augmented memory based on the first conversation that manifests itself in future avatar spoken responses in the future conversation, and wherein the future conversation references the content of the first conversation.

28. The method of claim 27, wherein the future conversation references the content of the first conversation by reciting a quote that was spoken by the user or the avatar during the first conversation.

* * * * *